(12) United States Patent
Chalasani et al.

(10) Patent No.: US 9,536,177 B2
(45) Date of Patent: Jan. 3, 2017

(54) DISTRIBUTIVE HIERARCHICAL MODEL FOR OBJECT RECOGNITION IN VIDEO

(71) Applicant: University of Florida Research Foundation, Inc., Gainesville, FL (US)

(72) Inventors: Rakesh Chalasani, Gainesville, FL (US); Jose C. Principe, Gainsville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 0 days.

(21) Appl. No.: 14/557,262

(22) Filed: Dec. 1, 2014

(65) Prior Publication Data

US 2015/0324655 A1 Nov. 12, 2015

Related U.S. Application Data

(60) Provisional application No. 61/910,399, filed on Dec. 1, 2013.

(51) Int. Cl.
| | |
|---|---|
| *G06K 9/00* | (2006.01) |
| *G06K 9/62* | (2006.01) |
| *G06K 9/32* | (2006.01) |
| *G06K 9/46* | (2006.01) |
| *G06F 17/30* | (2006.01) |

(52) U.S. Cl.
CPC ........... *G06K 9/6249* (2013.01); *G06K 9/3241* (2013.01); *G06K 9/4628* (2013.01); *G06K 9/6272* (2013.01)

(58) Field of Classification Search
USPC ........ 382/100, 103, 106–107, 154–155, 162, 382/165, 168, 173, 180–181, 189, 209, 382/219, 232, 254, 274, 276, 286–298, 382/305, 312; 707/737
See application file for complete search history.

(56) References Cited

U.S. PATENT DOCUMENTS

| | | | | |
|---|---|---|---|---|
| 2010/0195870 A1* | 8/2010 | Ai | ........................... | G06T 7/208 382/103 |
| 2010/0332475 A1* | 12/2010 | Birdwell | ........... | G06F 17/30333 707/737 |
| 2011/0243386 A1* | 10/2011 | Sofka | ................... | G06K 9/4619 382/103 |

(Continued)

OTHER PUBLICATIONS

Chalasani, R.; Principe, J.C., "Temporal Context in Object Recognition", IEEE Workshop on Machine Learning in Signal Processing (MLSP), Sep. 2012.

(Continued)

*Primary Examiner* — Seyed Azarian
(74) *Attorney, Agent, or Firm* — Thomas | Horstemeyer LLP; Christopher B. Linder; Randy R. Schoen

(57) ABSTRACT

Various examples are provided for object recognition in video. In one example, among others, a system includes processing circuitry including a processor. The processing circuitry is configured to process a sequence of images to recognize an object in the images, the recognition of the object based upon a hierarchical model. In another example, a method includes determining input data from a plurality of overlapping pixel patches of a video image; determining a plurality of corresponding states based at least in part upon the input data and an over-complete dictionary of filters; and determining a cause based at least in part upon the plurality of corresponding states. The cause may be used to identify an object in the video image.

14 Claims, 28 Drawing Sheets

(56) References Cited

U.S. PATENT DOCUMENTS

2012/0269436 A1* 10/2012 Mensink ............ G06K 9/00624
382/180
2014/0072213 A1* 3/2014 Paiton ................. G06K 9/4619
382/165

OTHER PUBLICATIONS

Chalasani, R.: Cinar, G.T., Principe, J.C.; "Sequential Causal Estimation and Learning from Time-Varying Images", IJCNN Jun. 2012.
Chalasani, R.: Principe, J.C.:, "Sparse Analog Associative Memory via L1-Regularization and Thresholding", Neural Networks (IJCNN), The 2011 International Joint Conference, Aug. 2011.

* cited by examiner

Require: Take $L^x_{0,n} > 0 \; \forall n \in \{nc\}$, $L^u_0 > 0$ and some $\eta > 1$.
Require: Initialize $x_{0,n} \in \mathbb{R}^k \; \forall n \in \{nc\}$, $u_0 \in \mathbb{R}^{d \times 1}$ and $\xi_1 = u_0, s_1 = 1, z_{1,n} = x_{0,n}, \tau_{1,n} = 1$ 1: while no convergence do
2:     Update $\lambda = \sqrt{2} \exp(-[Bu_k])$.
3:     for $n \in \{nc\}$ do
4:         Line search: Find the best step size $L^x_{k,n}$.
5:         Compute $$\begin{aligned} x_{k,n} &= p_{L_k}(z_{k,n}) \\ \tau_{k+1,n} &= \frac{1 + \sqrt{1 + 4\tau^2_{k,n}}}{2} \\ z_{k+1,n} &= x_{k,n} + \left(\frac{\tau_{k,n} - 1}{\tau_{k+1,n}}\right)(x_{k,n} - x_{k-1,n}) \end{aligned}$$

6:     end for
7:     Line search: Find the best step size $L^u_k$.
8:     Compute $$\begin{aligned} u_k &= p_{L_k}(\xi_k) \\ s_{k+1} &= \frac{1 + \sqrt{1 + 4s^2_k}}{2} \\ \xi_{k+1} &= u_k + \left(\frac{s_k - 1}{s_{k+1}}\right)(u_k - u_{k-1}) \end{aligned}$$

9:     Check for convergence.
10:     $k = k + 1$
11: end while

FIG. 3

(a) Gaussian Innovation + Sparsity (b) Sparse Innovation + Sparsity

Require: Take $L_{0,n}^x > 0 \, \forall n \in \{1, 2, ..., N\}$, $L_0^u > 0$ and some $\eta > 1$.

1: Initialize $x_{0,n} \in \mathbb{R}^K \, \forall n \in \{1, 2, ..., N\}$, $u_0 \in \mathbb{R}^Q$ and set $\xi_1 = u_0$, $z_{1,n} = x_{0,n}$.
2: Set step-size parameters: $\tau_1 = 1$.
3: while no convergence do
4:     Update
$$\gamma = \gamma_0 (1 + \exp(-|Bu_i|))/2$$
5:     for $n \in \{1, 2, ..., N\}$ do
6:         Line search: Find the best step size $L_{k,n}^x$.
7:         Compute $\alpha^*$ from (19)
8:         Update $x_{i,n}$ using the gradient from (22) with a soft-thresholding function.
9:         Update internal variables $z_{i+1}$ with step size parameter $\tau_i$.
10:     end for
11:     Compute $\sum_{n=1}^{N} |x_{i,n}|$
12:     Line search: Find the best step size $L_k^u$.
13:     Update $u_{i,n}$ using the gradient of (23) with a soft-thresholding function.
14:     Update internal variables $\xi_{i+1}$ with step size parameter $\tau_i$.
15:     Update
$$\tau_{i+1} = \left(1 + \sqrt{(4\tau_i^2 + 1)}\right)/2$$
16:     Check for convergence.
17:     $i = i + 1$
18: end while
19: return $x_{i,n} \, \forall n \in \{1, 2, ..., N\}$ and $u_i$

FIG. 10

Require: Inputs - $I_{1:T}$, $N$ - # FISTA iterations, $L$ - # layers, Parameters - $C^{1:L}$, $B^{1:L}$
Require: Hyper-parameters - $\lambda^{1:L}$, $\beta^{1:L}$, $\eta^{1:L}$, $\gamma_0^{1:L}$
Require: Initialize states - $X_0^{1:L} = 0$
1: for $t = 1 : T$ do // Loop over time
   // Top-down predictions.
2:    for $l = L : -1 : 1$ do // Loop over layers
3:       Compute $\hat{X}_t^l$ using (51)
4:       Predict: $\hat{U}_t^l$ using (50)
5:    end for
   // Bottom-up inference.
6:    Initialize: $X_t^l = X_{t-1}^l$, $U_t^l = \hat{U}_t^l$
7:    for $l = 1 : L$ do // Loop over layers
8:       for $n = 1 : N$ do // FISTA iteration
9:          Compute state prediction term: $\alpha^*$.
10:         Update states $X_t^l$ using (44) and (45).
11:         Max-pooling: $[down(X_t^{k,l}), p_t^{k,l}] = pool(X_t^{k,l})$.
12:         Update causes $U_t^l$ using (48).
13:         Unpool and re-compute $\gamma^l$ using (49).
14:       end for
15:    end for
16: end for

FIG. 22

DISTRIBUTIVE HIERARCHICAL MODEL FOR OBJECT RECOGNITION IN VIDEO

CROSS REFERENCE TO RELATED APPLICATIONS

This application claims priority to, and the benefit of, U.S. provisional application entitled "DISTRIBUTIVE HIERARCHICAL MODEL FOR OBJECT RECOGNITION IN VIDEO" having Ser. No. 61/910,399, filed Dec. 1, 2013, the entirety of which is hereby incorporated by reference.

STATEMENT REGARDING FEDERALLY SPONSORED RESEARCH OR DEVELOPMENT

This invention was made with government support under agreement M00014-10-1-0375 awarded by the Office of Naval Research. The Government has certain rights in the invention.

BACKGROUND

Humans recognize objects in images with little effort, despite variations in the images resulting from different distances or orientations of the camera. Objects can even be recognized when they are translated or rotated within the image or are partially obstructed from view. Machine recognition of objects in images is significantly more difficult.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3 is an example of a FISTA-like procedure for simultaneously updating states $x_t$ and causes $u_t$ in accordance with various embodiments of the present disclosure.

FIG. 10 is an example of a FISTA-like procedure for simultaneously updating states $x_t$ and causes $u_t$ in accordance with various embodiments of the present disclosure.

FIG. 22 is an example of a FISTA-like procedure for simultaneously updating states $X_t$ and causes $U_t$ in accordance with various embodiments of the present disclosure.

DETAILED DESCRIPTION

Figure 1:
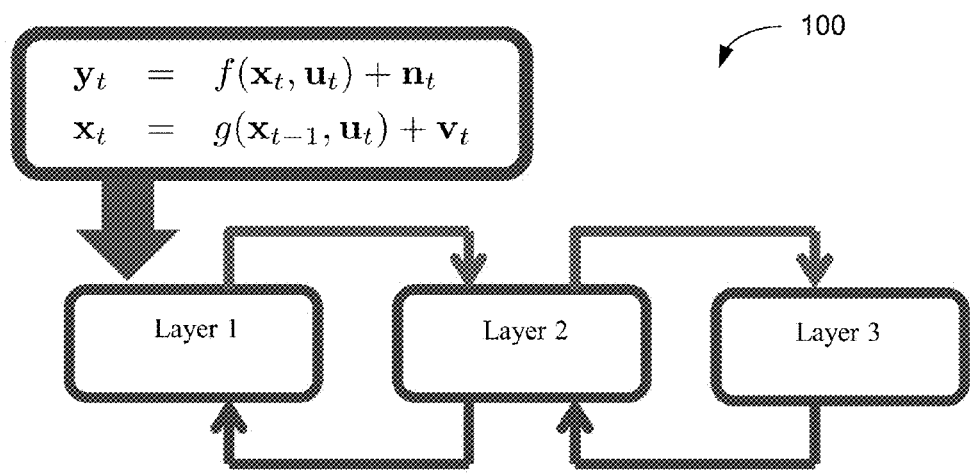
FIG. 1 is a graphical representation of an example of a model in accordance with various embodiments of the present disclosure.

Disclosed herein are various examples related to object recognition in video. Reference will now be made in detail to the description of the embodiments as illustrated in the drawings, wherein like reference numbers indicate like parts throughout the several views.

The complexity of visual object recognition lies in the ability to deal with the large number of variations an object can have in an environment. These variations can include scale, rotation, position, etc. To address this issue, various models for object recognition in a time-varying image sequence are discussed. The inputs from the images are processed in a distributive and hierarchical fashion, which can include both bottom-up and top-down processing with parameters that are learned from data in a self-organized manner. The model assesses small parts of the input data independently and combines them locally in a hierarchical fashion. To do this, each image frame can be divided into several blocks and a first layer of the model works on each block individually. The outputs from the block processing can then be fed as inputs to the next layer in the hierarchy and combined locally in the next layer. This forms a deep network, which can eventually produce a global representation of the inputs. Also, the state of the higher layers and temporal context can influence the representation at each layer.

Local features can be from the observations, which can then be combined together to form a globally invariant representation. The model includes state-space models with a sparsity constraint, acting as local feature extractors and also introducing temporal information. These models can be extended to extract locally invariant representations. Such models may then be arranged in a hierarchical network, with the output of one layer acting as input to another layer while also considering the dependencies between the layers. The features extracted using such hierarchical models can lead to an invariant representation which can then be fed to a classifier for robust object recognition.

A computational architecture is developed where goals and/or memory (past experience) from the top levels can be used locally as "time signals" and mixed with incoming sensory input at all hierarchical processing levels, from the micro to macro. To implement such approach, dynamic systems can be utilized as the building blocks of the computational architecture. Dynamic systems allow for two types of memory: long-term in its parameters and short-term in its states. The other advantage of a dynamic system framework is that it naturally handles time, uses direct functional mappings, encodes uncertainty, and can learn multiple internal variables in an online framework. Dynamics are also important to exploit and impose constraints that translate the smooth changes in natural visual or acoustic scenes. With dynamic models, the design constraints of on-line in situ computation, where memory, goals and computation are mixed efficiently, may be fulfilled.

In order to implement the active aspects of perception, a distributed, hierarchical computational model can be created where the expected goals are coded in top down signals (called "causes"), and that are combined in the dynamic models along with the bottom up inputs from a sensor. The causes, which reflect past experience, can be handled and stored by the autonomous system in a principled way. For example, content addressable memories can store the top layer causes as gestalts that translate past experience into active signals that can be used in the top down processing as priors to disambiguate the incoming sensory input. The sensory processing system therefore learns a sparse internal representation of the sensory input, and can store the learned information in local parameters as well as in sparse causes at the top layer to be used in future inferences.

Deep networks that use multiple hierarchical non-linear mappings offer more flexibility to model complex mappings and in a compact manner. The advantage is their distributive and hierarchical nature while representing the inputs and/or observations. The observations can be represented such that simple features extracted at the lower layers are combined in the higher layer through complex relationships and become progressively more abstract with the depth of the model. The re-usability of the lower layer feature extractors is advantageous for creating distinctive and abstract higher layer features. Every distinct path traversing from low-level features to a higher level forms a different representation. Such re-usability of feature extractors common for several distinctive classes not only leads to compact representations but also better generalization for some unknown classes.

Predictive coding can model the visual system as a generative model that tries to predict the external responses using some internal states. From a generative model perspective, the prediction error is the difference between the actual observation and the "generated" input from the model and the underlying causes (also called latent or hidden variables). Mathematically, if $y_t$ is an observation at time t, then it can be described by the underlying cause ($u_t$) as follows:

$$y_t = F(u_t) + v_t, \quad (1)$$

where $F(\bullet)$ is some observation (or measurement) function. With time-varying observations, intermediate hidden states ($x_t$) can be considered to encode the dynamics over time. Hence, a unified model that encodes a sequence of observations can be written as a generalized state-space model of the form:

$$y_t = F(x_t, u_t) + n_t$$

$$x_t = G(x_{t-1}, u_t) + v_t, \quad (2)$$

where G is a state transition function, and F and G can be parameterized by some set of parameters, $\theta$. The terms $u_t$ are called the unknown causes. To obtain abstract information from the observations, the causes having a non-linear relationship with the observations can be used. The hidden states, $x_t$, then mediate the influence of the cause on the observations and endow the system with memory. The terms $v_t$ and $n_t$ represent stochastic and model uncertainty in the predictions.

The basic block of the model that exists across all the layers can be expressed as:

$$y_t = f(x_t, u_t) + n_t$$

$$x_t = g(x_{t-1}, u_t) + v_t, \quad (3)$$

where $y_t$ is the data (or inputs) for that layer, and $f$ and $g$ are the functions that can be parameterized. Several such models can be stacked, such that the output from one layer acts as an input to the layer above, to form a hierarchical model. Mathematically, an L-layered network of this form can be written as:

$$y_t = f(x_t^{(1)}, u_t^{(1)}) + n_t^{(1)} \quad (4)$$

$$x_t^{(1)} = g(x_{t-1}^{(1)}, u_t^{(1)}) + v_t^{(1)}$$

$$\vdots$$

$$u_t^{(l-1)} = f(x_t^{(l)}, u_t^{(l)}) + n_t^{(l)}$$

$$x_t^{(l-1)} = g(x_{t-1}^{(l)}, u_t^{(l)}) + v_t^{(l)}$$

-continued $$u_t^{(L-1)} = f(x_t^{(L)}, u_t^{(L)}) + n_t^{(L)}$$

$$x_t^{(L)} = g(x_{t-1}^{(L)}, u_t^{(L)}) + v_t^{(L)}.$$

The causes $u_t$ at a lower layer form the "observations" to the layer above, i.e., the causes $u_t$ form the link between the layers while the states $x_t$ link the dynamics over time. The terms $v_t^{(l)}$ and $n_t^{(l)}$ are stochastic fluctuations at the higher layers, and enter each layer independently. This model forms a Markov chain across the layers and the latent variables at any layer are now only dependent on the observations coming from the layer below and the predictions from the layer above. The higher-level predictions also influence the inference at lower levels. The predictions at the higher layer non-linearly enter into the state space model at a bottom layer by empirically altering the prior causes $u_t$ of the bottom layer. Hence, the top-down connections, along with the horizontal (or recurrent) connections in the state space, directly influence the inference in the bottom layers. Features of this hierarchical model include:

- bidirectional (top down and bottom up) in situ processing that enables the model to be controlled both by sensory data and causes from the higher layers, forming an active perception model;
- consideration of dynamics in the visual input, which allows for temporal context awareness during perception;
- storing of only salient features of the input data, thereby forming a compressed and sparse representation; and
- the possibility of reusable modules that can be efficiently implemented in hardware.

Referring to FIG. 1, shown is a graphical representation of an example of a model 100 including three layers. In FIG. 1, each layer represents a state-space model (or a group of models) comprising one or more basic blocks. Outputs from blocks in a layer can be combined together to form the input to the next layer. The backward connections coming from the higher-layers influence the representation in the bottom layers. As the lower layers are guided by the higher layers to encode a particular object, the lower layers encode the transformation in the object and pass on an invariant representation to the layer above. The higher layers encode more abstract knowledge and evolve more slowly over time.

In object recognition, sparse representation can be used to extract features from the observations. An observation, $y_t \in \mathbb{R}^M$ at any time t, can be expressed as a linear combination of the columns of an over-complete dictionary $C \in \mathbb{R}^{M \times N}$, with $x_t \in \mathbb{R}^N$ (N>M) acting as coefficients (or hidden variables) over the columns of the dictionary. Such a system can be stated in general as a sparse coding problem given by:

$$\hat{x}_t = \operatorname{argmin} \|y_t - Cx_t\|_2^2 \, s.t. \|x_t\|_1 < \epsilon, \quad (5)$$

where an $l_1$-norm ensures that the distribution over the coefficients is sparse (or has low entropy). The inference of the coefficients from EQN. (5) can be extended to learn the dictionary, C, such that it is adapted to the observation statistics.

Within the frame work of EQN. (3), a sparse state representation can be obtained in a dynamical system with known parameters. The parameters of such a model can be efficiently learned using ideas from dual estimation Kalman filtering. Also, in place of traditional pooling methods like max and average pooling, a simple extension to this model may be used to obtain causes, $u_t$. Representations that are invariant to certain transformations in the observations can be provided, and the information can be pooled in a local neighborhood. This may be done by learning higher-order dependencies between the dictionary elements. An approximate solution to extract sparse states, $x_t$, in a dynamical system will be discussed, and a simple extension to this model may be utilized to infer the causes, $u_t$, and also to learn the parameters of the model. This model can be used to extract features for object recognition in a video sequence, which may lead to a marked improvement in classification performance.

In addition to the observation model in EQN. (5), the states have stochastic transitions over time that can be considered. Consider that the states are dynamically evolving as:

$$x_t = f(Ax_{t-1}) + v_t$$

$$y_t = Cx_t + n_t, \quad (6)$$

where the first equation is called the state transition equation. Matrix $A \in \mathbb{R}^{N \times N}$ is the state transition matrix, $f(\bullet)$ id a point-wise non-linear function, and $n_t$ and $v_t$ are the state transition noise and measurement noise, respectively. It can be assumed that the distribution over the noise term $n_t$ is Gaussian with zero mean and a known variance, $\sigma^2$. To be consistent with the goal of extracting the sparse states $x_t$, the innovations $v_t$ should also be considered as sparse. Hence, this model combines two different priors: temporal information and sparsity. It can be shown that, the mode of the posterior distribution of $p(x_t|y,x_{t-1})$ can be written as:

$$\hat{x}_t = \operatorname{argmin}_{x_t} \|y_t - Cx_t\|_2^2 + \alpha \|x_t - f(Ax_{t-1})\|_1 + \lambda \|x_t\|_1 \alpha, \lambda > 0, \quad (7)$$

The main bottleneck comes from the presence of two non-smooth terms in EQN. (7). To avoid this, consider a strong non-linearity that can induce sparsity on the state predictions while maintaining the innovations as a Gaussian distribution instead of sparse innovations. In the other words, the above problem can be redefined as:

$$\hat{x}_t = \operatorname{argmin}_{x_t} \|y_t - Cx_t\|_2^2 + \alpha \|x_t - f(Ax_{t-1})\|_2^2 + \lambda \|x_t\|_1, \quad (8)$$

where the non-linear function can be modeled as:

$$f(x) = \beta(\tan h(x - \theta) + \tan h(x + \theta)). \quad (9)$$

Figure 2:
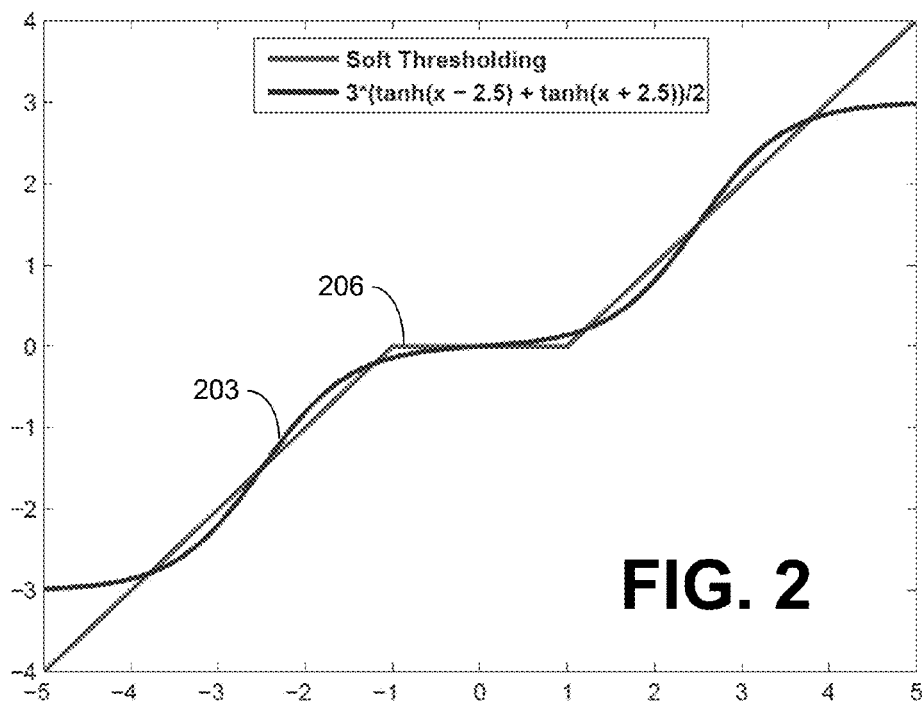
FIG. 2 is a graphical representation of an example of a smooth non-linear function that approximates a soft thresholding function in accordance with various embodiments of the present disclosure.

FIG. 2 is a graph illustrating an example of how the smooth non-linear function of EQN. (9), as depicted by curve 203, approximates the soft thresholding function sign(x)(|x|−2), as depicted by curve 206, which is typically used in sparse inducing models. Since this function is differentiable with respect to the parameters A, θ and β; these parameters can be learned using gradient methods as will be discussed.

In the cost function of EQN. (8), the first two terms can be combined as smooth and convex functions in $x_t$ and the last sparsity term as a non-smooth convex function. Such an optimization problem can be readily solved using proximal methods like a fast iterative shrinkage-thresholding algorithm (FISTA) and can be shown to converge at a very fast rate.

The second part of the inference procedure involves combining the features extracted using the procedure described above. The causes should extract some abstract information from the observations that are invariant to local transformations like rotation, translation, etc. A simple extension to the above state-space model that tries to find higher-order dependencies between the dictionary of features and hence, able to extract more abstract information.

Traditional hard coded pooling operators like max or average pooling can only lead to translation invariance by combining features in a local neighborhood. However, one can achieve better invariance to local transformations by learning the relationship between dictionary elements in the matrix C. This may be done by modulating the sparsity parameter, λ, on the dictionary elements. The model can be extended to include both local pooling as well as learning local transformations. In other words, the states $x_t$ and the causes $u_t$ are solved for by minimizing the following cost:

$$L = \Sigma_{n \in \{ne\}} \{ \|y_t^n - Cx_t^n\|_2^2 + \alpha\|x_t^n - f(Ax_{t-1}^n)\|_2^2 \} + \Sigma_i^N \Sigma_{n \in \{ne\}} \{-\log(\lambda_i) + \lambda_i|x_{t,i}^n|\} + \gamma\|u_t\|_1, \quad (10)$$

where $\lambda_i = \sqrt{2}\exp(-[Bu_t]_i)$. Here {ne} indicates a set of local neighboring image patches, $u_t \in \mathbb{R}^d$ are the unknown causes and $B \in \mathbb{R}^{k \times d}$ are a set of parameters determining the influence the causes have on the states. It is assumed that the sparsity pattern of all the patches in a local neighborhood are similar and hence, can be pooled together.

To infer $x_t$ and $u_t$, a modified FISTA algorithm can be used for inferring both simultaneously. The cost of EQN. (10) can be minimized using block co-ordinate descent, which alternates between updating the states and the causes while keeping the other constant. For a fixed value of the states, the cost function for inferring the causes can also be considered a convex and smooth function regularized with a non-smooth $l_1$-norm and hence, can be solved using FISTA. FIG. 3 shows an example of an algorithm for simultaneously updating $x_t$ and $u_t$ using a FISTA-like procedure. At each iteration, the states and the causes are updates, while the other is fixed, by taking only single step updates. Note that such an update procedure does not guarantee any convergence, the problem is not convex when both $x_t$ and $u_t$ unknown, but in all simulations results the solution converged within a few iterations. Using this algorithm, the causes $u_t$ and the states $x_t$ are inferred simultaneously. Moreover, the states $x_t$ and the causes $u_t$ are coupled so that, at each iteration, updates of the states are directly modulated by the backward connections coming from the causes and vice versa. This implies that the states are now inferred using bottom-up ($y_t$), horizontal ($x_{t-1}$) and top-down ($u_t$) influences.

In the preceding discussion, the states $x_t$ and causes $u_t$ were inferred with the assumption that the parameters are fixed. In other embodiments, the parameters may be learned "online" using a sequential dual estimation procedure. This may be accomplished by considering two state space models working concurrently, one estimating the states with fixed parameters while the other estimates the parameters with the states fixed.

Figure 4:
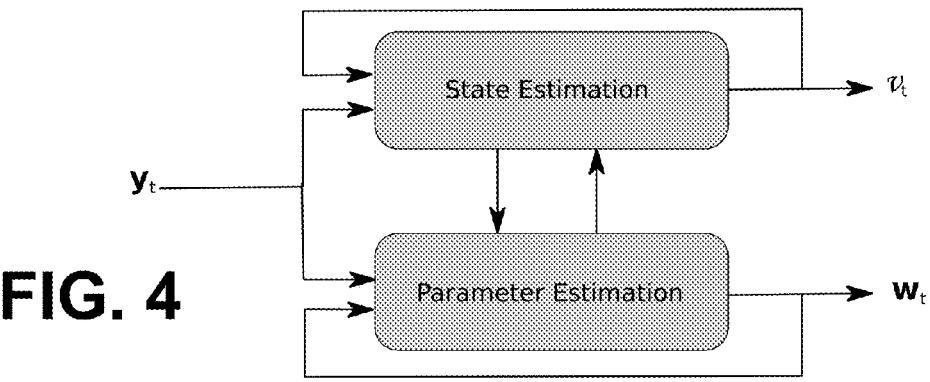
FIG. 4 is a block diagram illustrating an example of sequential dual estimation in accordance with various embodiments of the present disclosure.

For a state space model, sequential dual estimation can be used for simultaneously inferring the variables and learning the parameters. By considering two Kalman filters working concurrently, one can estimate the states with the parameters fixed, while the other estimates the parameters with the states fixed. FIG. 4 shows a block diagram illustrating the sequential dual estimation procedure. For each observation, $y_t$, both the states and the causes, $v_t = \{x_t, u_t\}$, and the parameters, $w_t$, are updated concurrently, with one fixed while the other is updated. If $w_t$ is the set of all the parameters at a time t, then these parameters are updated by minimizing the following cost function with the states and the causes fixed:

$$w_t = \arg\min L(x_t, u_t) + \lambda_w \|w_t - w_{t-1}\|_2^2, \quad (11)$$

where $L(x_t, u_t)$ is as defined in EQN. (10).

Since it is assumed that all the variable estimates are held fixed and not a function of $w_t$, it effectively separates the state transition equation and the measurement equation in EQN. (6) while learning the parameters. Hence, updating the parameters becomes similar to prediction-error coding. However, to reduce the computational cost the covariance matrix of the state transition equation is not updated for the weights as in Kalman filtering, but instead the parameters are updated using simple gradient descent procedures. Also, each column of the matrices C and B are normalized to be of unit norm to avoid any trivial solution.

The second part in the cost function of EQN. (11) gives the parameters with the state transitions modeled as random walk. This helps keep track of the parameters, with the parameter $\lambda_w$ how fast the observations are discarded from the past to update the parameters. Also, the recursive solution that is obtained from this model can be considered to be a generalization of a recursive least squares (RLS) algorithm. The learning can be made more efficient by updating the parameters after running interference over a small sequence of observations, instead of updating the parameters at every time. This also leads to more stable optimizations while using LBFGS (limited-memory Broyden-Fletcher-Goldfarb-Shanno) based gradient descent updates.

Figure 5:
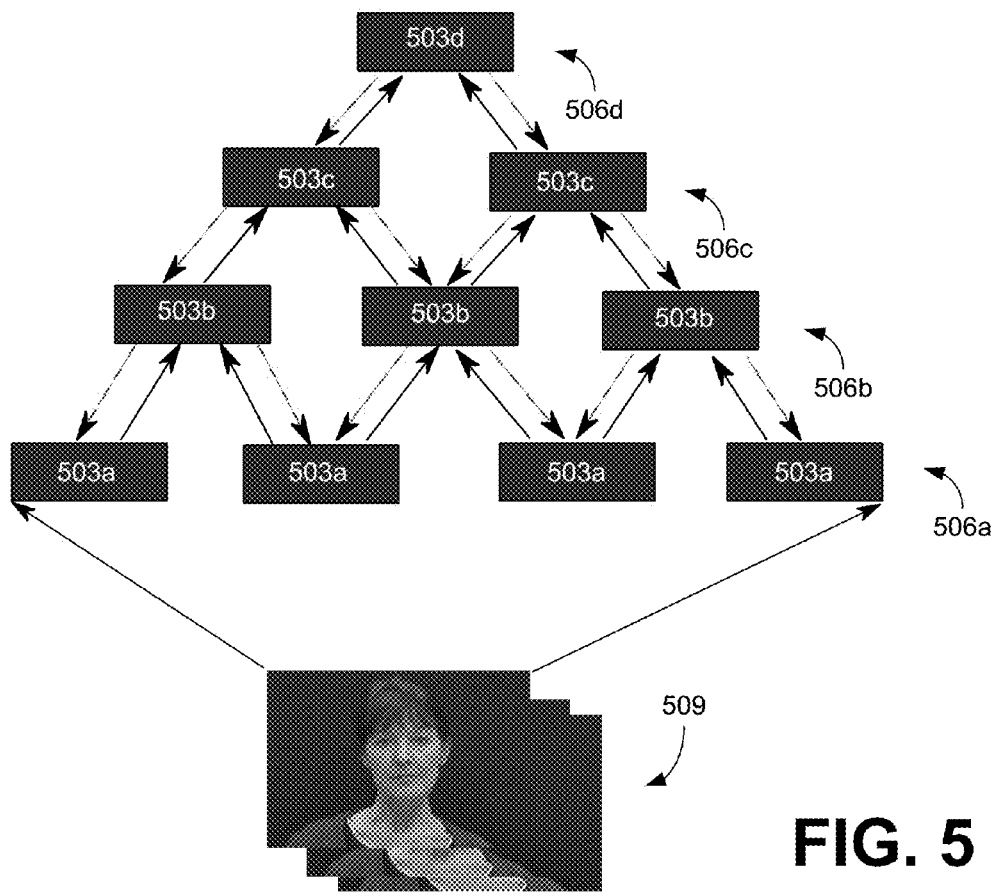
FIG. 5 is an example of a distributed hierarchical model in accordance with various embodiments of the present disclosure.

A hierarchical model can be formed by stacking several blocks with the same functional working as described above. Referring to FIG. 5, shown is an example of a distributed hierarchical model, where each block 503 represents one model that is working on a small part of the image. The parameters for all the blocks 503 within each layer 506 are same. However, each layer 506 in itself has a different set of parameters. The idea is that the bottom layer 506*a* extracts local features from the scene and feeds them into a higher layer 506*b*, where these local features are pooled together to extract a more abstract representation invariant to several other transformations. These are again fed to even higher layers 506*c* and 506*d* to extract even more abstract representations and finally, to obtain a representation that is invariant to several global transformations. The distributed hierarchical model can extract information from a video sequence 509.

The hierarchical model can perform feature extraction for invariant object recognition. To achieve invariance to several transformations, the feature extractors have to provide a robust representation that would be helpful for recognition. Most existing methods perform this using match filters or handcrafted features like SIFT, etc. These methods require human "experts" to provide large number of labeled data per class or to determine the best feature extractors. However, the model discussed here is learned from the data itself and requires a far less number of examples per class during classifier training. This in turn leads to minimal human intervention. Also, since it is a distributive network, it can perform feature extraction from different parts of the input in parallel. This can lead to efficient use of the hardware modules that can be repeatedly used and also scale for large throughputs.

One application of the hierarchical model is in visual object recognition. The hierarchical model can be used to recognize objects in a continuous video stream. Without loss of generality, the hierarchical model may be compounded with other object tracking algorithms, which can help focus on a particular object through time. The effectiveness of the hierarchical model without a tracking algorithm was examined considering the object of interest is centered in the entire video stream. The hierarchical model was used to extract features while considering temporal context in the first layer.

Figure 6A:
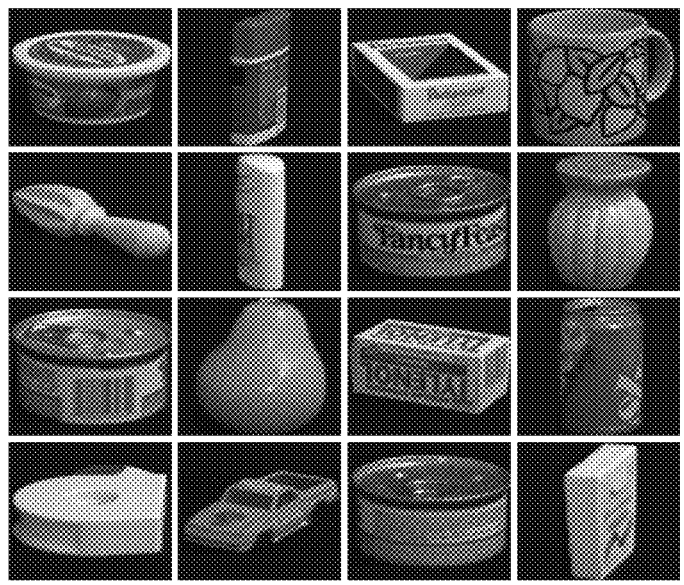
FIGS. 6A through 6C show random samples of two datasets used for testing a distributed hierarchical model in accordance with various embodiments of the present disclosure.
Figure 6B:
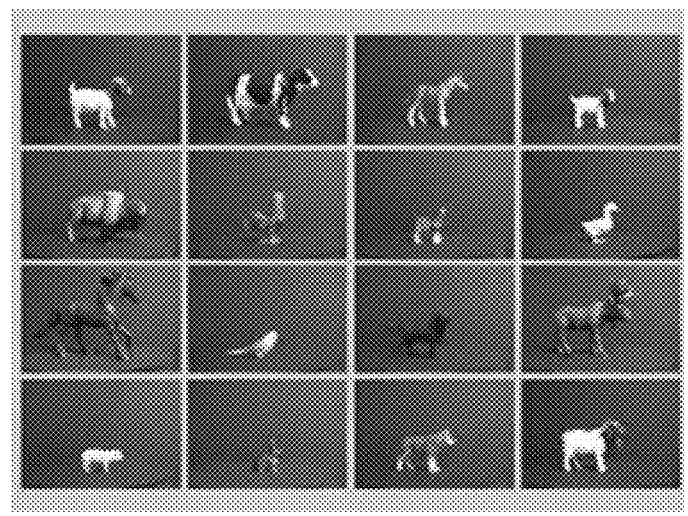
Figure 6C:
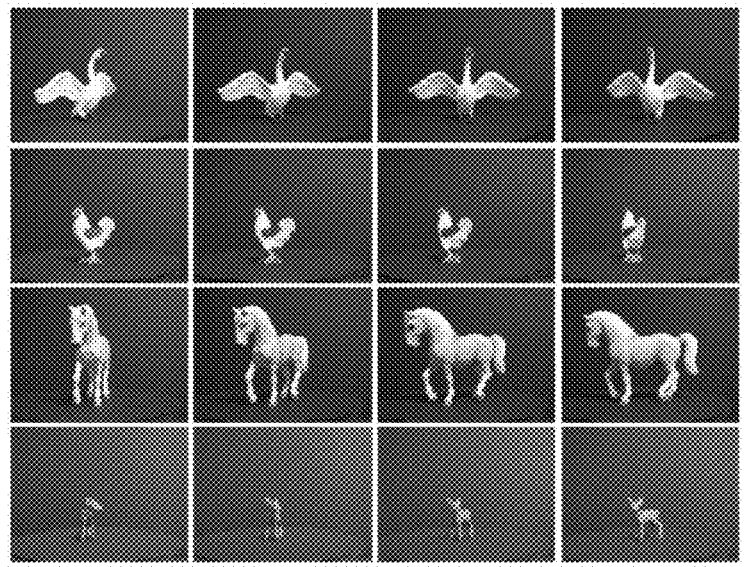

For the testing, the two different datasets shown in FIGS. 6A and 6B were used. FIG. 6A shows random samples of a COIL-100 dataset that contains 100 different objects. For each object, there is a sequence of 72×72 pixel frames obtained at 72 different views. Each object was placed on a turntable and a picture taken for every 5-degree turn to obtain a total of 7200 frames. Each frame was clipped to fit the object and is passed through illumination normalization. Because of the clipping, the same scale is not maintained within each sequence. FIG. 6B shows random samples of an animal dataset that contains 60 different animal toys, which were placed on a turntable to obtain a video sequence. The video sequence was then down sampled such that two consecutive frame show roughly a 5 degree rotation in the object. Each object sequence contains at least 72 frames. Unlike the COIL-100 dataset, each frame was not clipped and the same scale was maintained across all the sequences. For testing, each frame was down sampled to be 72×72 pixel long. Referring to FIG. 6C, each row shows a part of the sequence for one of four different objects of the animal dataset.

Each frame was preprocessed by first normalizing to be zero mean and unit norm, followed by local contrast normalization. Then each 72×72 pixel frame was divided into 12×12 pixel blocks with a stride of 4 pixels and each block was further divided into four 9×9 pixel patches with overlapping. Each block is considered a local neighborhood for pooling.

A feature-sign algorithm (FS) was used to obtain sparse features for classification. This was considered a baseline to compare the results. Two different variants of the method were used: one that used only the state-space without any invariant representation (or causes) (SC-DS) and another that learned the invariant representation (or causes) (ISC-DS) as well. In all the cases, a 64 dimensional long dictionary was considered. The number of principle components of a 9×9 patch was found to be less than 64 and hence, having 64 dictionary elements is in fact an over-complete representation. For FS and SC-DS, the following pipeline was used for pooling over the states with in each block: absolute value rectification+contrast normalization+average pooling. On the other hand, for ISC-DS 64 dimensional long causes were considered and the state representations in each block were pooled into a single cause. A linear support vector machine (SVM) with L2-regularization was used as a classifier that uses the features obtained from the three methods described above as inputs.

In the testing, the model was first learned using randomly sampled sequences of 12×12 blocks from the COIL-100 dataset. Using the learned system, features were extracted for the entire "video" sequence; and sequences of all the objects were concatenated to form a longer sequence. Four frames per object at viewing angles 0°, 90°, 180°, 270° were then considered as labeled data used for training the classifier and the rest of the frames were used for testing. During training, the testing data was considered to be accessible. Similarly, for the animal dataset the features for the entire sequence were extracted and four frames randomly selected per object for training the classifier. The rest were considered as test data. During training, the testing data was considered to be accessible. TABLE 1 shows the classification results (%) obtained for the datasets.

TABLE 1

| Dataset | Sparse Coding | SC-DS + Avg. Pooling | ISD-DS | Convolutional Neural Network |
|---|---|---|---|---|
| COIL-100 | 66.87 | 71.81 | 74.63 | 71.49 |
| Animal | 76.09 | 82.34 | 85.82 | — |

It was observed that the classification performance improves while considering the temporal context when compared to standard sparse coding. Moreover, learning the invariant representation also improved the performance when compared to just considering average pooling. It was also able to outperform the convolutional neural network.

The test results indicate that the hierarchical model is capable of classifying objects in video, invariant to the several transformations they may have. Since the learning of the model parameters is done in an unsupervised fashion, the number of labeled data required is much less. This in turn leads to minimal human intervention. The distributive algorithmic nature enables the hierarchical model to process the input images/videos in parallel, enabling the process to be used for real time applications using GPUs. Since the same basic module is used repeatedly across the layers in the architecture, the same basic hardware module can be used repeatedly, which can increase efficiency.

Figure 7:
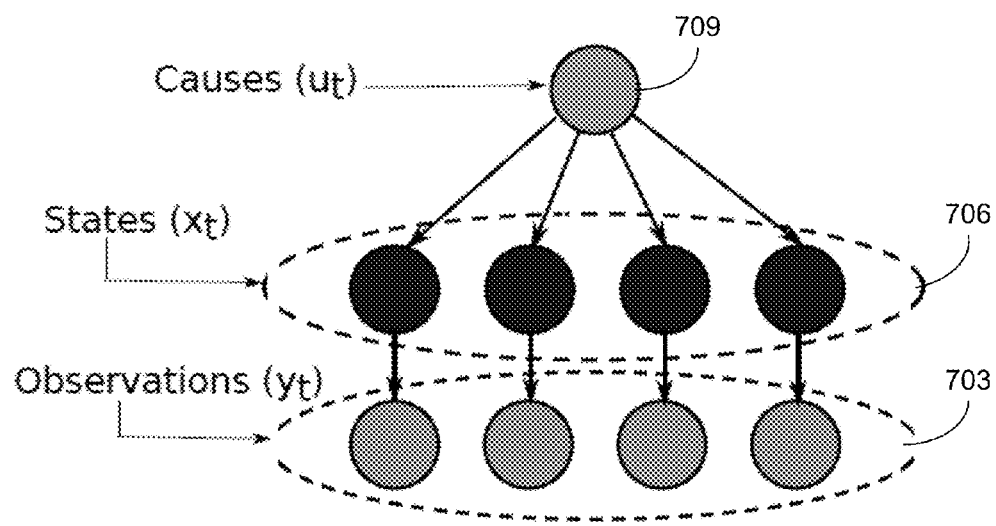
FIG. 7 is a graphical representation of an example of a single layer dynamic network in accordance with various embodiments of the present disclosure.

The dynamic network to extract features from a small part of a video sequence will now be further examined. As discussed, the centerpiece of the proposed model is extracting sparse features from time-varying observation sequences using a dynamic model. The feature extraction (or sparse coding) block can be extended to introduce a pooling strategy to learn invariant feature representations from the data. The two stage model first extracts features (inferring states) and then pools them to form more complex representations (inferring causes), similar to simple and complex cells in regions of the visual cortex. FIG. 7 shows an example of a single layer network that can be used on a group of small overlapping patches of the video input. The bottom bubbles 703 represent a group of inputs or observations ($y_t$), the middle bubbles 706 represent states ($x_t$) corresponding to the observations, and the top bubble 709 represents causes ($u_t$) that pool all the states within the group.

To begin, let $\{y_1, y_2, \ldots, y_t, \ldots\} \in \mathbb{R}^P$ be a P-dimensional sequence of a patch extracted from the same location across all the frames in a video. Here, $y_t$ is a vectorized form of a $\sqrt{P} \times \sqrt{P}$ square patch extracted from a frame at time t. For the feature extraction (inferring states), sparse coding can be used in conjunction with a linear state space model to map the inputs $y_t$ at time t onto an over-complete dictionary of K-filters, $C \in \mathbb{R}^{P \times K}$ (K>P), to get sparse states $x_t \in \mathbb{R}^K$. To keep track of the dynamics in the latent states, a linear function with state-transition matrix $A \in \mathbb{R}^{K \times K}$ (can be used. More formally, assume that the inputs are synthesized using the following generative model with an $l_1$ sparsity regularization on the states $x_t$:

$$y_t = Cx_t + n_t$$

$$x_t = Ax_{t-1} + v_t \quad (12)$$

To infer the states $x_t$ in this dynamic sparse coding (DSC) model, the following energy function is minimized:

$$E_1(x_t, y_t, C, A) = \mu \|y_t - Cx_t\|_2^2 + \lambda \|x_t - Ax_{t-1}\|_1 + \gamma \|x_t\|_1. \quad (13)$$

Figure 8:
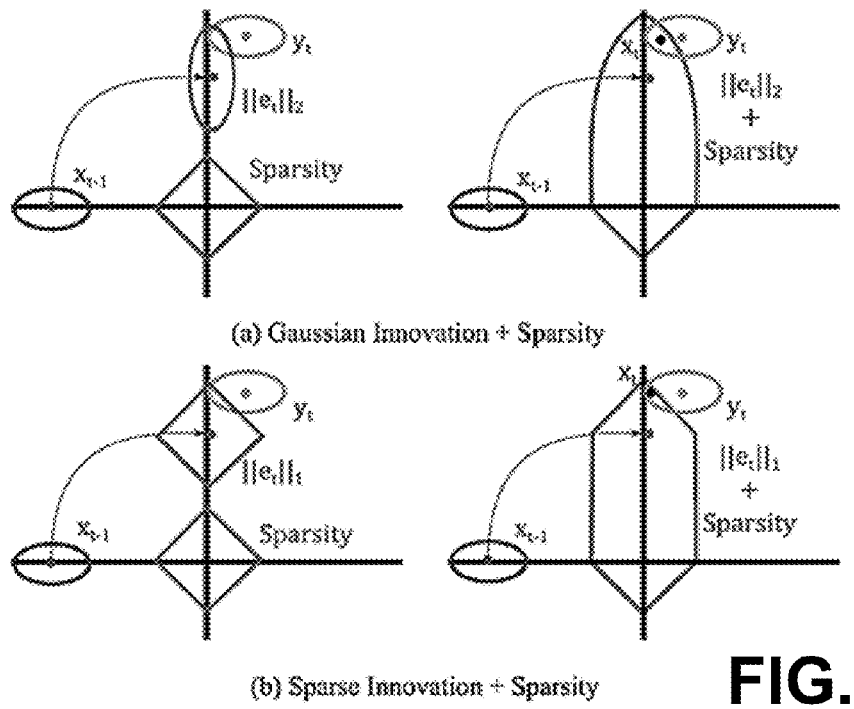
FIG. 8 is a graphical representation illustrating Gaussian (or "dense") and sparse innovation distributions in accordance with various embodiments of the present disclosure.

Note that the second term involving the state-transition is also constrained to be sparse, implying that the number of change in the features over time is small. This not only makes sense in practice where visual inputs that are usually encountered are slowly changing over time, but also makes the state-space representation more consistent and leads to a sparser solution. FIG. 8 illustrates the comparison between modeling the innovations as sparse versus "dense" (or Gaussian distribution) (similar to Kalman filtering but without updating the covariance matrix over time). With respect to the Gaussian innovations of FIG. 8(a), the combined prior is smooth around the solution and might not maintain the sparsity of the output solution. With respect to the sparse innovations of FIG. 8(b), the combined prior acting in the states is sharper and leads to a much sparser solution. Notice that the shape of the combined regularizer over the states around the solution is sharper with sparse innovations of FIG. 8(b), indicating that it promotes better sparsity than when the innovations are modeled as a Gaussian distribution as in FIG. 8(a).

To take advantage of the spatial relationships in a local neighborhood, a small group of states $x_t^{(n)}$, where $n \in \{1, 2, \ldots N\}$ represents a set of contiguous patches w.r.t. the position in the image space, are added (or sum pooled) together. Such pooling of the states may be lead to local translation invariance. On top of this, D-dimensional causes $u_t \in \mathbb{R}^D$ can be inferred from the pooled states to obtain representation that is invariant to more complex local transformations like rotation, spatial frequency, etc. This invariant function can be learned such that it can capture the dependencies between the components in the pooled states. Specifically, the causes $u_t$ can be inferred by minimizing the energy function:

$$E_2(u_t, x_t, B) = \sum_{n=1}^{N} \left( \sum_{k=1}^{N} |\gamma_k \cdot x_{t,k}^{(n)}| \right) + \beta \|u_t\|_1 \quad (14)$$

$$\gamma_k = \gamma_0 \left[ \frac{1 + \exp(-[Bu_t]_k)}{2} \right],$$

where $\gamma_0 > 0$ is some constant. Note that here $u_t$ multiplicatively interacts with the accumulated states through B, modeling the shape of the sparse prior on the states. The invariant matrix B can be adapted such that each component $u_t$ connects to a group of components in the accumulated states that co-occur frequently. In other words, whenever a component in $u_t$ is active, it lowers the coefficient of a set of components in $x_t^{(n)}$, $\forall n$, making them more likely to be active. Since co-occurring components typically share some common statistical regularity, such activity of $u_t$ typically leads to a locally invariant representation.

Though the two cost functions are presented separately above, we can combine both to devise a unified energy function of the form:

$$E(x_t, u_t, \theta) = \quad (15)$$

$$\sum_{n=1}^{N} \left( \frac{1}{2} \|y_t^{(n)} - Cx_t^{(n)}\|_2^2 + \lambda \|x_t^{(n)} - Ax_{t-1}^{(n)}\|_1 + \sum_{k=1}^{K} \left| \gamma_k \cdot x_{t,k}^{(n)} \right| \right) +$$

$$\beta \|u_t\|_1$$

$$\gamma_{t,k} = \gamma_0 \left[ \frac{1 + \exp(-[Bu_t]_k)}{2} \right],$$

where $\theta = \{A, B, C\}$. Both $x_t$ and $u_t$ can be inferred concurrently from EQN. (15) by alternatively updating one while keeping the other fixed using an efficient proximal gradient method.

To learn the parameters in EQN. (15), $E(u_t, x_t, \theta)$ can be alternatively minimized using a procedure similar to block co-ordinate descent. First, the latent variables $(x_t, u_t)$ can be inferred while keeping the parameters fixed, and then the parameters $\theta$ can be updated while keeping the variables fixed. This continues until the parameters converge. The inference procedure and the parameter update using a gradient descent method will now be discussed separately.

Both $x_t$ and $u_t$ can be jointly inferred from EQN. (15) using proximal gradient methods, and taking alternative gradient descent steps to update one while holding the other fixed. In other words, $x_t$ and $u_t$ can be updated in an alternating fashion using a single update step to minimize $E_1$ and $E_2$, respectively. However, updating $x_t$ is relatively more involved. So, keeping aside the causes, inferring sparse states alone from E1 is initially discussed, and then the joint inference of both the states and the causes will be discussed.

Inferring States. Inferring sparse states, given the parameters, from a linear dynamical system forms the basis of the model. This can be performed by finding the solution that minimizes the energy function $E_1$ in EQN. (15) with respect to the states $x_t$ (while keeping the sparsity parameter $\gamma$ fixed). Here there are two priors of the states: the temporal dependence and the sparsity term. Although this energy function $E_1$ is convex in $x_t$, the presence of the two non-smooth terms makes it difficult to utilize standard optimization techniques that are used for sparse coding alone.

A smooth proximal gradient method that can approximate the energy function $E_1$ and that is able to use efficient solvers like fast iterative shrinkage thresholding alogorithm (FISTA) can be used. Initially, Nestrov's smoothness method is used to approximate the non-smooth state transition term. The resulting energy function is a convex and continuously differentiable function in $x_t$ with a sparsity constraint, and hence, can be efficiently solved using proximal methods like FISTA.

Smooth approximation of sparse innovations: To begin, let $\Omega(x_t) = \|e_t\|_1$ where $e_t = (x_t - Ax_{t-1})$. The idea is to find a smooth approximation to this function $\Omega(x_t)$ in $e_t$. Notice that, since $e_t$ is a linear function of $x_t$, the approximation will also be smooth w.r.t. $x_t$. Now, $\Omega(x_t)$ can be rewritten using the dual norm of $l_1$ as:

$$\Omega(x_t) = \mathrm{argmax}_{\|\alpha\|_\infty \leq 1}[\alpha^T e_t], \quad (16)$$

where $\alpha \in \mathbb{R}^k$. Using Nestrov's smoothing approximation on $\Omega(x_t)$:

$$\Omega(x_t) \approx f_\mu(e_t) = \mathrm{argmax}_{\|\alpha\|_\infty \leq 1}[\alpha^T e_t - \mu d(\alpha)], \quad (17)$$

where $$d(\cdot) = \frac{1}{2}\|\alpha\|_2^2$$

is a smoothness function and $\mu$ is a smoothness parameter. From Nestrov's theorem ("Smooth minimization of non-smooth functions" by Y. Nesterov, *Mathematical Programming*, 103(1):127-152, May 2005), it can be shown that $f_\mu(e_t)$ is convex and continuously differentiable in $e_t$ and the gradient of $f_\mu(e_t)$ with respect to $e_t$ takes the form:

$$\nabla_{e_t} f_\mu(e_t) = \alpha^*, \quad (18)$$

where $\alpha^*$ is the optimal solution to $f_\mu(e_t) = \mathrm{argmax}_{\|\alpha\|_\infty \leq 1} [\alpha^T e_t - \mu d(\alpha)]$. This optimal solution of $\alpha$ in EQN. (17) is given by:

$$\alpha^* = \mathrm{argmax}_{\|\alpha\|_\infty \leq 1} \left[ \alpha^T e_t - \frac{\mu}{2} \|\alpha\|^2 \right] \quad (19)$$

$$= \mathrm{argmax}_{\|\alpha\|_\infty \leq 1} \left\| \alpha - \frac{e_t}{\mu} \right\|^2$$

$$= S\left(\frac{e_t}{\mu}\right),$$

where S(•) is a function projecting $$\left(\frac{e_t}{\mu}\right)$$

onto an $l_\infty$-ball. This is or me form:

$$S(x) = \begin{cases} x, & -1 \le x \le 1 \\ 1, & x > 1 \\ -1, & x < -1 \end{cases} \quad (20)$$

Now, by using the chain rule and since $f_\mu(e_t)$ is also convex and continuously differentiable in $x_t$, the gradient of $f_\mu(e_t)$ w.r.t $x_t$ also turns out to be the same.

Figure 9:
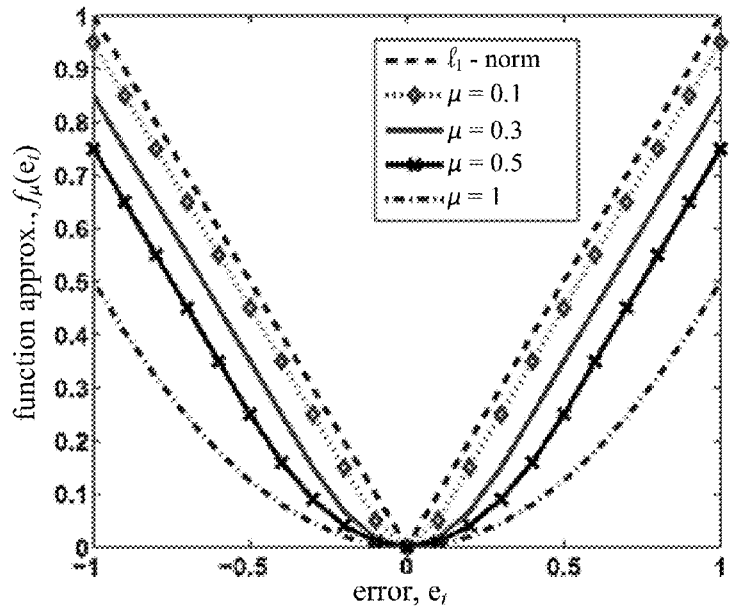
FIG. 9 is a plot illustrating the effect of a smoothing function in accordance with various embodiments of the present disclosure.

Effect of smoothing: To visualize the effect of the above described smoothing operation, the function $f_\mu(e_t)$ was plotted for a one-dimensional error signal $e_t \in \mathbb{R}$ for various values of $\mu$. Note that $\mu$ determines the maximum value of $\alpha$ in EQN. 17 ($\alpha^*$) corresponding to each error value. Referring to FIG. 9, shown is a plot illustrating the effect of smoothing on the cost function. The plot shows the smoothing function $f_\mu(e_t)$ versus a one dimensional error signal $e_t$ for various values of the smoothness parameter $\mu$.

As indicated in FIG. 9, the sharp point in $l_1$-norm around the origin is smoothed in the approximated function $f_\mu(e_t)$. It can also be seen that, as the value of $\mu$ increases, the approximation, though smoother, starts to deviate more from the $l_1$-norm. In fact, it can be shown that, given a desired accuracy $\epsilon$ of the solution, following the convergence results based on Theorem 2 in "Smoothing proximal gradient method for general structured sparse regression" by Chen et al. (*The Annals of Applied Statistics*, 6(2):719-752, June 2012) suggests that $\mu=\epsilon/k$ leads to the best convergence rate, where k is the dimension of the states.

Smoothing proximal gradient descent for DSC: With this smoothing approximation, the overall cost function from EQN. 13 can be re-written as:

$$x_t = \operatorname{argmin}_{x_t} \frac{1}{2}\|y_t - Cx_t\|_2^2 + \lambda f_\mu(e_t) + \lambda\|x_t\|_1, \quad (21)$$

with the smooth part $$h(x_t) = \frac{1}{2}\|y_t - Cx_t\|_2^2 + \lambda f_\mu(e_t) \quad$$

whose gradient with respect to $x_t$ is given by:

$$\nabla_{x_t} h(x_t) = C^T(y_t - Cx_t) + \lambda\alpha^*, \quad (22)$$

Using the gradient information in EQN. (22), it is possible to solve for $x_t$ from EQN. (21) using FISTA.

Inferring Causes. Given a group of state vectors, $u_t$ can be inferred by minimizing $E_2$, where a generative model is defined that modulates the sparsity of the pooled state vector, $\Sigma_n|x^{(n)}|$. Here, FISTA can be readily applied to infer $u_t$, as the smooth part of the function $E_2$ given by:

$$h(u_t) = \sum_{k=1}^K \left(\gamma_0\left[\frac{1+\exp(-[Bu_t]_k)}{2}\right] \cdot \sum_{n=1}^N |x_{t,k}^{(n)}|\right), \quad (23)$$

is convex, continuously differentiable. Note that the matrix B is initialized with non-negative entries and continues to be non-negative without any additional constraints. This allows the gradient of $h(u_t)$, given by:

$$\nabla_{u_t} h(u_t) = -B^T \sum_{k=1}^K \left(\gamma_0\left[\frac{\exp(-[Bu_t]_k)}{2}\right] \cdot \sum_{n=1}^N |x_{t,k}^{(n)}|\right), \quad (24)$$

to be Lipschitz continuous and hence, guarantees convergence with a bound on the convergence rate of the solution.

Joint Inference. It has been shown thus far that both $x_t$ and $u_t$ can be inferred from their respective energy functions using a first-order proximal method called FISTA. However, for joint inference the combined energy function in EQN. (15) is minimized over both $x_t$ and $u_t$. This can be accomplished by alternately updating $x_t$ and $u_t$ while holding the other fixed, and using a single FISTA update step at each iteration. The internal FISTA step size parameters are maintained between iterations. This approach is equivalent to alternating minimization using gradient descent. Although this procedure no longer guarantees convergence of both $x_t$ and $u_t$ to the optimal solution, in all of the simulations it has lead to a reasonably good solution. FIG. 10 shows an example of an algorithm for simultaneously updating $x_t$ and $u_t$ using a FISTA-like procedure. Notations (19) in line 7, (22) in line 8, and (23) in line 13 refer to the corresponding equations numbers listed above. Note that, with the alternating update procedure, each $x_t$ is now influenced by the feed-forward observations, temporal predictions and the feedback connections from the causes.

With $x_t$ and $u_t$ fixed, we update the parameters by minimizing E in EQN. (15) with respect to $\theta$. Since the inputs are a time-varying sequence, the parameters are updated using dual estimation filtering; e.g., an additional constraint is put on the parameters such that they follow a state space equation of the form:

$$\theta_t = \theta_t + z_t, \quad (25)$$

where $z_t$ is the Gaussian transition noise over the parameters. This keeps track of their temporal relationships. Along with this constraint, the parameters can be updated using gradient descent. Notice that with fixed $x_t$ and $u_t$, each of the parameter matrices can be updated independently, whose gradient is obtained as follows:

$$\nabla_A E(\bullet) = \operatorname{sign}(x_t - A_t x_{t-1})x_t^T + \zeta(A_t - A_{t-1})$$

$$\nabla_C E(\bullet) = (y_t - C_t x_t)x_t^T + \zeta(C_t - C_{t-1})$$

$$\nabla_B E(\bullet) = (\exp\{[Bu_t]\} \cdot |x_t|)u_t^T + \zeta(B_t - B_{t-1}), \quad (26)$$

where $\zeta$ acts as a forgetting factor. Matrices C and B can be column normalized after the update to avoid a trivial solution.

Mini-Batch Update: To get faster convergence, the parameters are updated after performing inference over a large sequence of inputs instead of at every time instance. With this "batch" of signals, more sophisticated gradient methods, like conjugate gradient, can be used and, hence, can lead to more accurate and faster convergence.

Performance testing of the dynamic sparse coding (DSC) disclosed above was carried out with other methods including sparse coding using FISTA (SC), Kalman filtering, and re-weighted $l_1$ dynamic filtering (RWL1-DF) for comparison. The DSC was also examined while considering the state innovations in EQN. (13) as Gaussian (SC-L2 innovations), as depicted in FIG. 8, with the inference using FISTA. The test set-up included simulating a state sequence with 20 non-zero elements in a 500-dimensional state vector evolving with a permutation matrix (this keeps the number of non-zero elements same over time), which is different for every time instant. This state sequence was then passed through a Gaussian scaling matrix to generate a sequence of observations. The observation dimensions (p) were varied depending on the test. Both the permutation and the scaling matrices were considered known apriori.

The observation noise was Gaussian with zero mean and variance $\sigma^2 = 0.001$. The sparse state-transition noise, which was simulated by choosing a subset of active elements (n) in the state vector chosen randomly and switching each of them with a randomly chosen element (with uniform probability over the state vector), was considered. This resembles a sparse innovation in the states with 2n wrongly placed elements, one "missing" element and one "additional" element. These generated observation sequences were used as inputs and the apriori known parameters were used to infer the states $x_t$. To set the hyper-parameters, a parameter sweep was performed to find the best configuration for each method. The inferred states were compared from the different methods with the true states in terms of relative mean squared error (rMSE); defined as:

$$\frac{\|x_t^{est} - x_t^{true}\|}{\|x_t^{true}\|}. \tag{27}$$

Figure 11A:
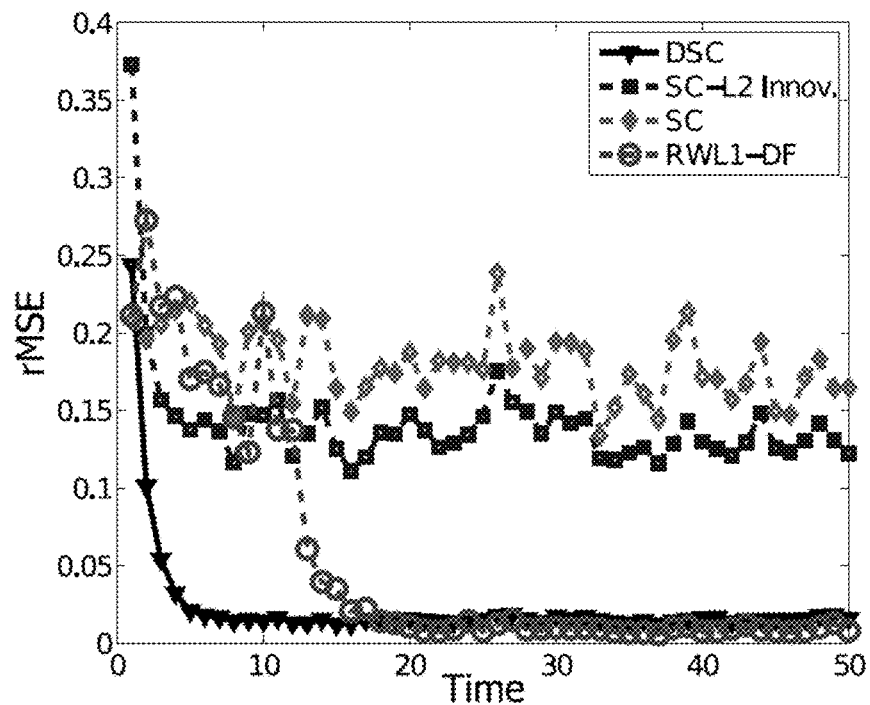
FIGS. 11A through 11C are plots illustrating examples of performance of a dynamic sparse coding (DSC) model in accordance with various embodiments of the present disclosure.

Referring to FIG. 11A, shown are plots of the tracking performance of the DSC with sparse innovation while tracking sparse states and of the other methods. The plots show the relative mean square error (rMSE) versus time and each plot is an average over 40 runs. The testing was performed with p=70, n=3 and the parameters were set at $\lambda=10$ and $\gamma=10$ in EQN. (13). The Kalman filtering failed to track the states and is not shown in FIG. 11.

TABLE 2

| Methods | DSC | SC-L2 innovations | SC | RWL1-DF |
|---|---|---|---|---|
| Time (seconds) | 0.17 | 0.16 | 0.27 | 0.54 |

TABLE 2 shows the computation time (per time instance) for all of the methods. All computations are done on an 8-core Intel Xeon, 2.4 GHz processor. It can be seen from FIG. 11A that DSC is able to track the states over time more accurately than SC, which does not use any dynamics. The dynamic model with Gaussian innovations (SC-L2 innovations), performed better than the SC model at times, but was not able to track the state accurately, which indicates that considering sparse innovations can make the model more stable and consistent. Finally, RWL1-DF was able to track the states as accurately as the DSC model, but required several observations before reaching a steady state and was computationally more expensive. In fact, it was observed that RWL1-DF becomes very unstable when the observations have "inadequate" information, as a result of a very noisy observation or when the number of observation dimensions is less.

Figure 11B:
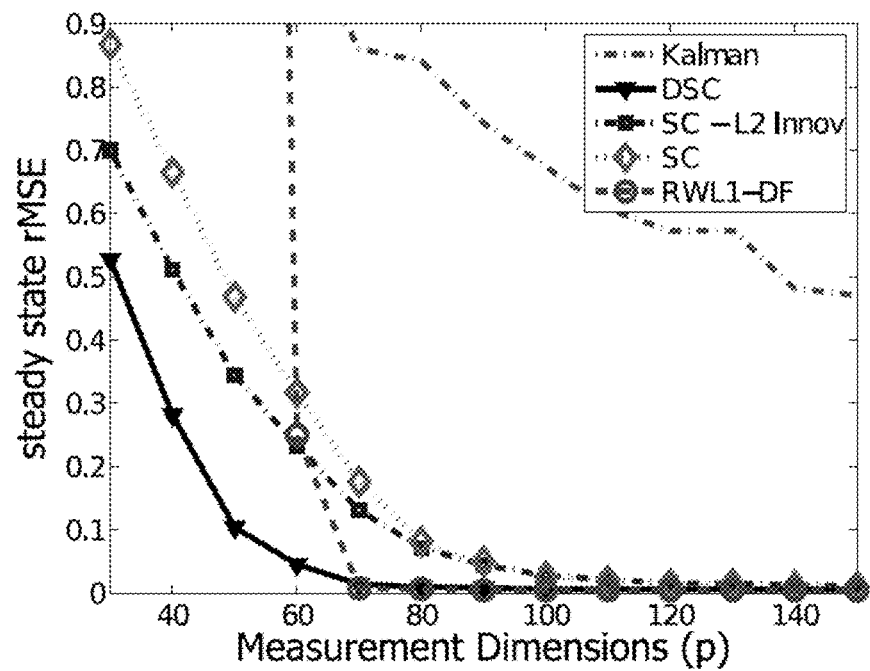

Referring next to FIG. 11B, shown is the performance of the DSC with various observation dimensions. A similar set of parameters were used with n=3, $\lambda=10$ and $\gamma=10$. FIG. 11B shows the "steady" state error (rMSE) after 50 time instances versus the dimensionality of the observation sequence (p). Each point is obtained after averaging over 50 runs. It can be seen that DSC was able to track the true states even for a low dimensional observations, while the other methods failed. This illustrates that the temporal relations adopted in the DSC model provides contextual information necessary to track the changes in the observation, even when the information provided by the instantaneous observations is not sufficient. Note that RWL1-DF becomes very unstable when the dimension of the observations is small.

Figure 11C:
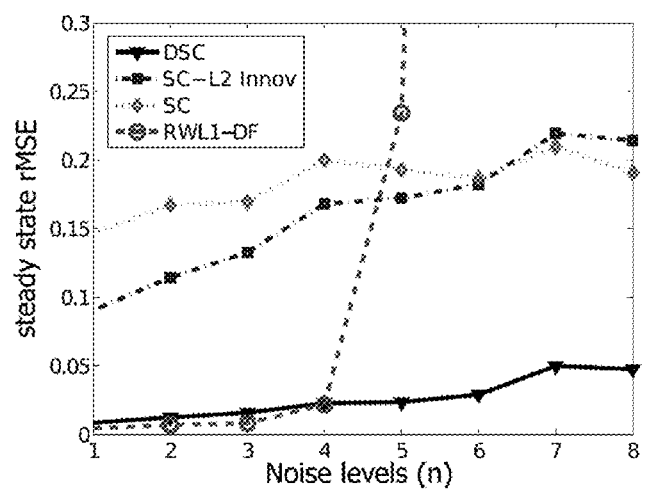

Similar results can be extrapolated in case of noisy observation sequences, where the essential information in the time sequence is scarce. Referring to FIG. 11C, shown is the performance of the DSC with various (sparse) noise levels. A similar set of parameters were used with p=70, $\lambda=10$ and $\gamma=10$. FIG. 11C shows the performance of all the methods versus the sparse noise levels (n). Again, it can be seen that DSC outperforms the other methods, particularly when the noise levels are high. Also, notice that the RWL1-DF becomes very unstable when the noise levels are high.

Testing was also performed to show that the working of the states and causes resemble that of simple and complex cells in the visual cortex. The states act as simple feature detectors, while causes encode complex invariances. However, the responses of both the states and the causes are influenced by the context, coming from both the temporal and the top-down connections, making them capable representing observations that are beyond their characteristic receptive fields.

First, consider learning a model from natural video sequences obtained from the Van Hateren's video database. This database contains several video clips of natural scenes containing animals, tree, etc. and each frame of these video clips was preprocessed using local contrast normalization. Sequences of patches were then extracted from the preprocessed video sequences to learn the parameters of the model. 17×17 pixel patches were used to learn 400 dimensional states and 100 dimensional causes. The pooling between the states and the causes were considered to be 2×2. Each of the 17×17 patches were further divided into 4 overlapping 15×15 pixel patches and the states extracted from each of these subdivided patches were pooled to obtain the causes as illustrated in FIG. 7.

Figure 12A:
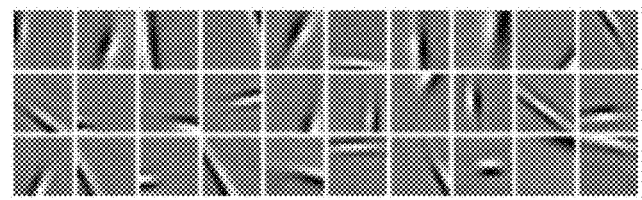
FIGS. 12A and 12B illustrate examples of receptive fields of states and causes of the DSC model in accordance with various embodiments of the present disclosure.
Figure 12B:
Figure 13A:
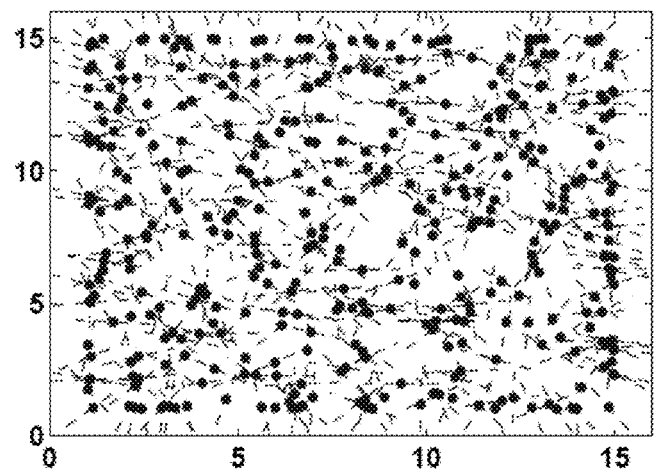
FIGS. 13A-13B and 14A-14B are examples of scatter plots illustrating dictionary elements of the DSC model in accordance with various embodiments of the present disclosure.
Figure 13B:
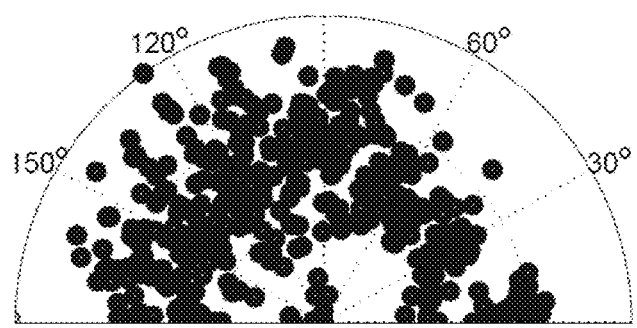

Referring to FIGS. 12A and 12B, shown are receptive fields of the model at different levels. FIG. 12A shows the receptive fields of the states, i.e., the columns of the observation matrix $C^{(1)}$. FIG. 12B shows the receptive fields of the causes. The receptive were constructed as a weighted combination of the columns of the layer 1 observation matrix $C^{(1)}$. FIGS. 12A and 12B shows the receptive fields of the states/causes, respectively, at different levels of the learned model. The receptive fields of the states are simple inclined lines resembling Gabor function, while that of the causes resemble grouping of these primitive feature, localized in orientation and/or spatial position. FIGS. 13A and 13B visualize the observation matrix learned from natural videos using the Gabor fit. FIG. 13A shows the scatter plot of the center positions of the dictionary elements along with the orientations and FIG. 13B shows the polar plot of the orientations versus spatial frequency.

Figure 14A:
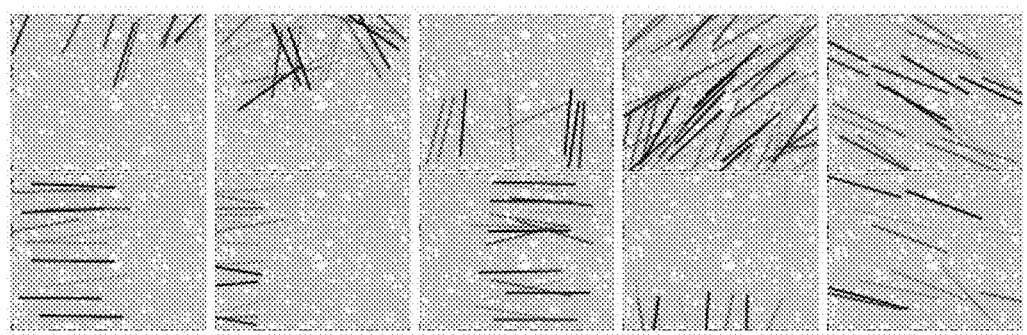
Figure 14B:
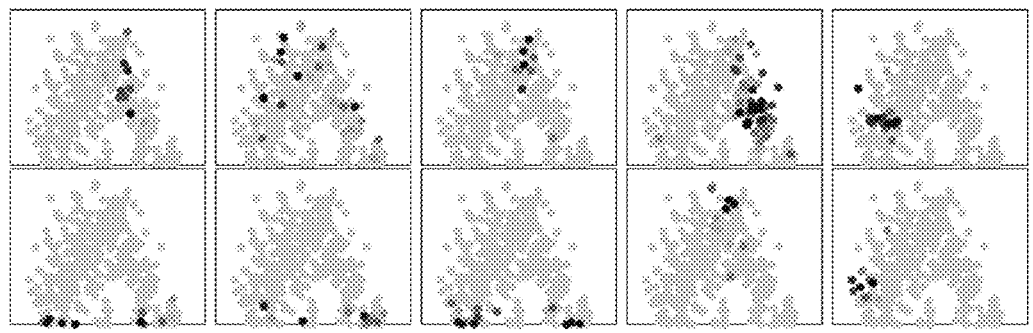

To get a better understanding of the invariance learned by the model, the connections between the first layer states and the causes can be visualized. FIGS. 14A and 14B show examples of the results obtained. First, each dictionary element (with a receptive field of 15×15 pixels) in the observation matrix ($C^{(1)}$) was fitted with a Gabor function and was parametrized in terms of the center position, spatial frequency and orientation of the Gabor functions, as shown in FIGS. 13A and 13B. Then the connection strength between the invariance matrix ($B^{(1)}$) and the observation matrix ($C^{(1)}$) was plotted. The subset of the dictionary elements that are most likely to be active when a column of the invariance matrix is active are shown. Each box represents one column of the invariance matrix $B^{(1)}$ and 10 out of 100 columns were randomly selected.

FIG. 14A shows the center and orientation scatter plots and FIG. 14B shows the corresponding the spatial frequency and orientation polar plots, highlighting the subset of most active dictionary elements for a select columns of $B^{(1)}$ (darker colors indicate stronger connections). Note that, for each active column in $B^{(1)}$, a subset of the dictionary elements (not unique) are grouped together according to orientation and/or spatial position, indicating invariance to the other properties like spatial frequency and center position. It was observed that most of the columns of the invariance matrix grouped together dictionary elements that have a similar orientation and frequency, while being invariant to the other properties like translation. However, there are other types of invariances where the dictionary elements were grouped only by spatial location while being invariant to other properties.

Figure 15A:
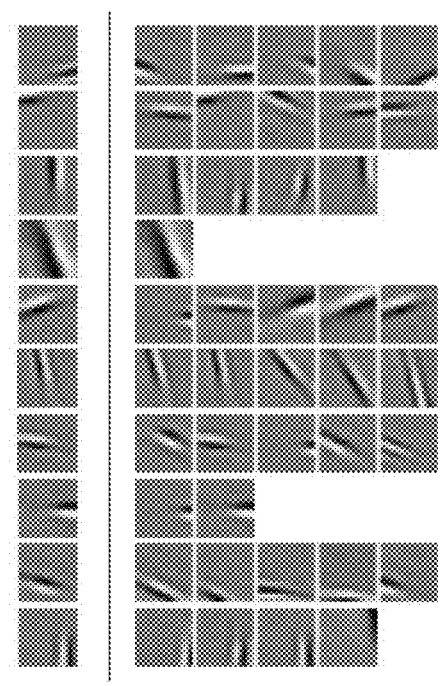
FIGS. 15A and 15B illustrate examples of temporal structure learned by the DSC model in accordance with various embodiments of the present disclosure.
Figure 15B:
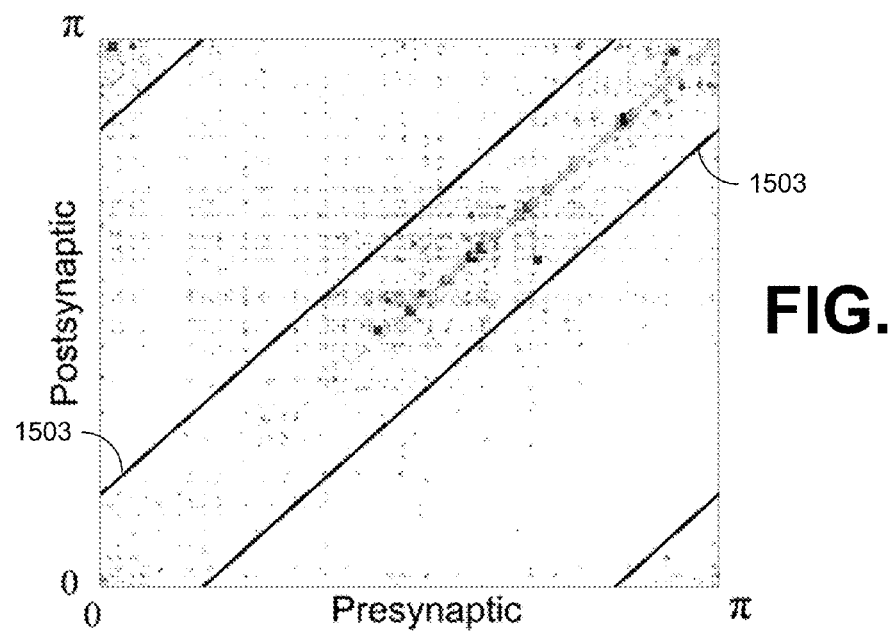

The receptive fields of the bottom layer states in the DSC model resemble that of simple cells in V1 area of visual cortex. These cells act as simple oriented filters and strongly respond to particular inputs. However, their influence extends beyond their receptive fields, modulating the response of other cells, in both excitatory and inhibitory ways, depending on the spatial and temporal contextual information. In the DCS approach, the temporal context at each layer is modeled using the parameter matrix $A^{(l)} \forall l$. FIGS. 15A and 15B show a visualization of a parameter matrix at the bottom layer.

FIGS. 15A and 15B illustrate the temporal structure learned by the model. FIG. 15A depicts the connection strength (of matrix $A^{(1)}$) between the layer 1 state elements over time. It can be read as follows: if the basis on the left is active at time t (presynaptic), then the corresponding set of basis on the right indicate the prediction for time t+1 (postsynaptic). This indicates that certain properties, like orientation and spatial positions, change smoothly over time. FIG. 15B is a scatter plot of the 15 strongest connections per each element in the matrix $A^{(1)}$, arranged according to the orientation selectivity of the pre and post synaptic elements. Notice that most points are within π/6 from the diagonal, indicated by the black lines 1503.

It can be seen that the model learns to maintain certain properties, like orientation and spatial position, over time. In other words, given that a basis is active at a particular time, it has excitatory connections with a group of basis (sometimes with strong self-recurrence connection) making them more likely to be active at the next time instance. On the other hand, along with the sparsity regularization, it also inhibits response of other elements that are not strongly connected with the active basis over time.

Figure 16A:
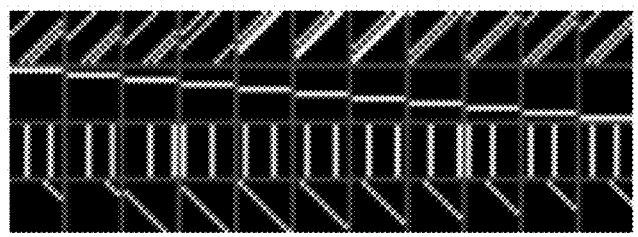
FIGS. 16A through 16C illustrate the role of temporal connections during inference in accordance with various embodiments of the present disclosure.
Figure 16B:
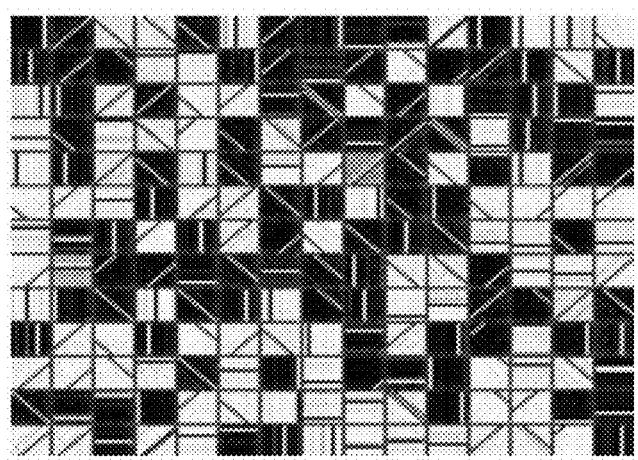
Figure 16C:
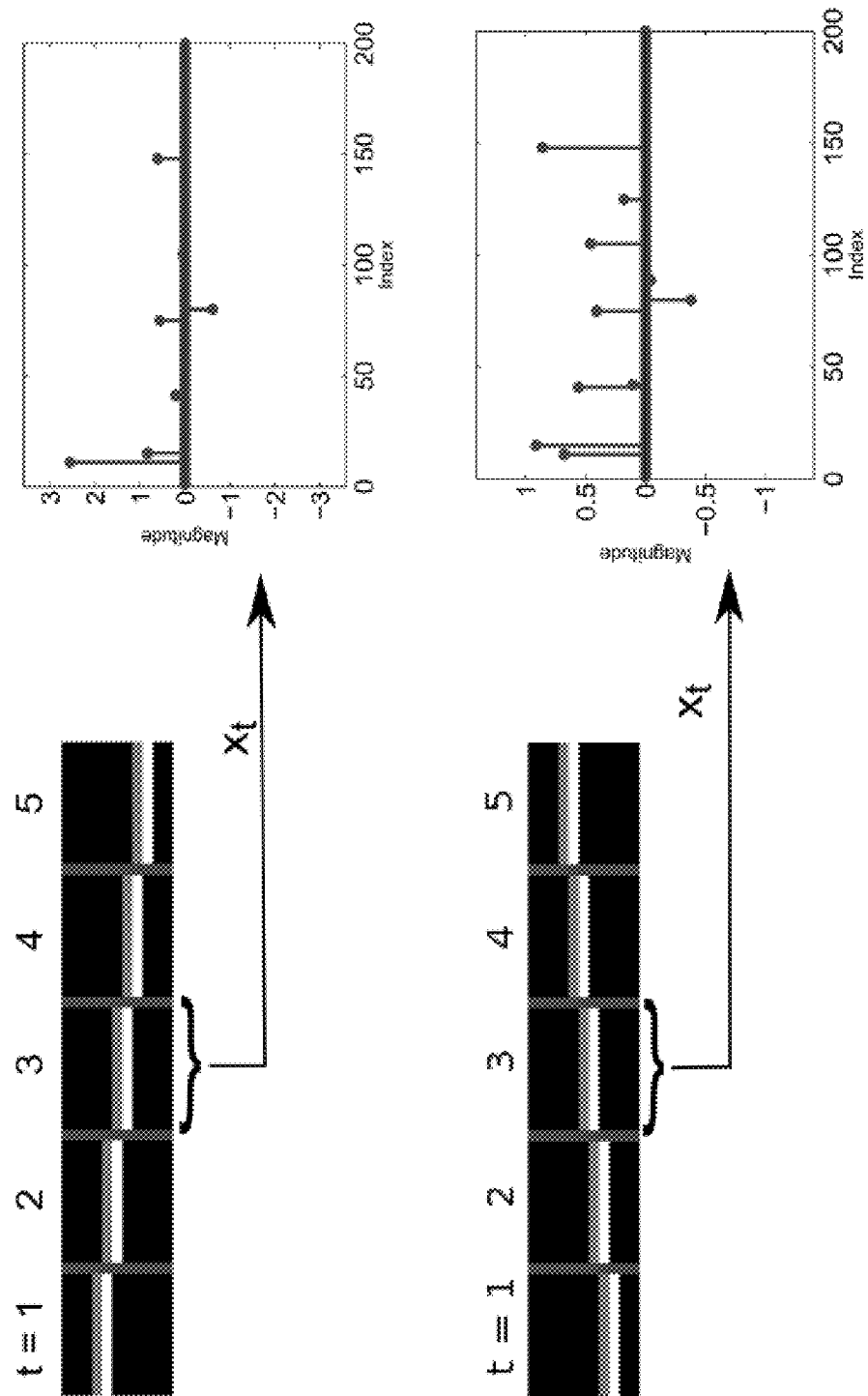

The tests show that the states at any time t are closely related to the states at time (t−1). Additional testing was performed to determine if the context helps to disambiguate on aliased observation or if a similar pattern occurring in two different sequences can be differentiated. In this test, an observation sequence was made up of patches, with each patch containing parallel lines (number of lines chosen uniformly between 1 to 5) with the same orientations (also chosen uniformly from four different orientations), such that from one frame to the other the patch is shifted by only one pixel. FIGS. 16A through 16C illustrate the role of temporal connections during inference. FIG. 16A shows a set of sequences, each row representing one sequence, generated using the above procedure. Again, such sequences are concatenated to form a longer sequence of observations. FIG. 16B shows the basis (matrix C) learned from these inputs.

Since only the temporal connections are of interest, no causes are considered (i.e., $u_t=0$) during this test. After learning the system on the observation sequences, the parameters were fixed and presented to the system in two sequences: a sequence of a particular shape and the same sequence in reverse order, as shown in FIG. 16C. Note that at time t=3 the input is the same but in a different context. In the first case, the pattern was moving from top to bottom, while in the second case it was moving in the opposite direction. It can be seen in FIG. 16C that the inferred states at time t=3 are different. As such, the context in which a particular pattern is observed changes its representation. Note that having observations alone at each time can do the same. In addition to this, the system is also capable to learn a representation such that it can still "generate" the observations back using the basis, even though with different representations.

Next, a deep predictive coding network (DPCN) comprising a hierarchical dynamic model will be discussed. The feature extraction block that was discussed above will be used to construct the hierarchical model using greedy layer-wise unsupervised learning. The hierarchical model can be configured such that an output from one layer acts as an input to the layer above. In other words, the layers are arranged in a Markov chain such that the states at any layer are only dependent on the representations in the layer below and above, and are independent of the rest of the model. The overall goal of the dynamic system at any layer is to make the best prediction of the representation in the layer below using the top-down information from the layers above and the temporal information from the previous states.

Figure 17:
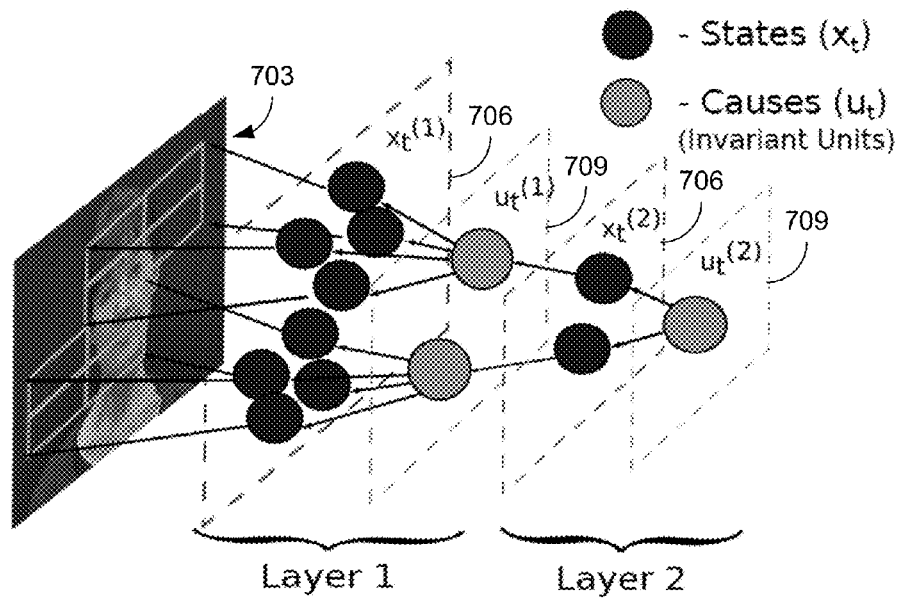
FIG. 17 is a graphical representation of an example of a hierarchical model, multi-layer dynamic network in accordance with various embodiments of the present disclosure.

The architecture of the multilayered processing model is a tree structure, with an encoding module replicated at each node of the tree. FIG. 17 shows an example of a two-layered hierarchical model constructed by stacking several state-space models. For visualization no overlapping is shown between the image patches in FIG. 17, but overlapping patches are considered during actual implementation. At the bottom layer, the nodes are arranged as a tiling of the entire visual scene and the parameters across all the nodes are tied, resembling a convolution over the input frame. Each node encodes a small patch of the input video sequence, which is useful for parallelizing the computation. The computational model is uniform within a layer, and across layers, albeit with different dimensions. The only thing that changes is the nature of the input data. Note that, within each block, the features extracted from a spatial neighborhood are pooled together, indicating a progressively increasing receptive field size of the nodes with the depth of the network. For this reason, the activation duration of a given feature can also slow down with the depth of the module. Parameter learning at each layer uses a greedy layer-wise procedure, where the parameters at the bottom layer modules can be learned from a sequence of small patches extracted from the input video sequences, and after the learning of the next layer starts.

Figure 18:
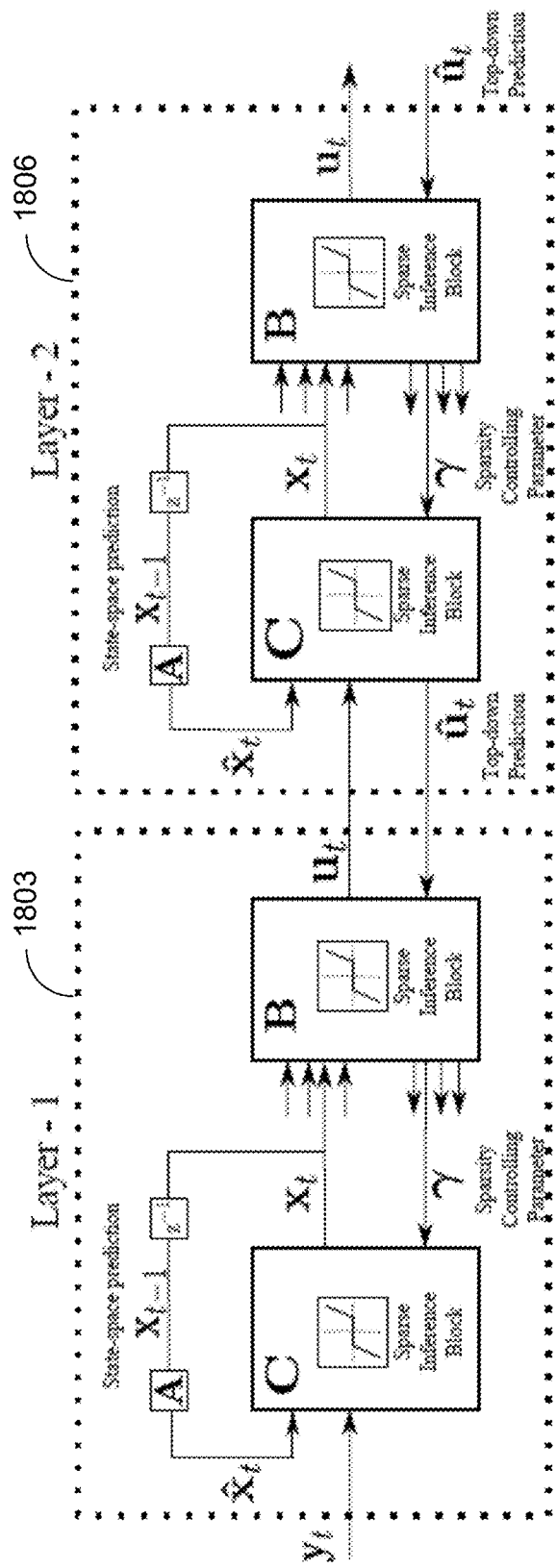
FIG. 18 is a block diagram illustrating an example of the flow of bottom-up and top-down information in accordance with various embodiments of the present disclosure.

Referring next to FIG. 18, shown is a block diagram illustrating an example of the flow of bottom-up and top-down information in the model. The example of FIG. 18 illustrates the inference on a two-layer network with a single module in each layer for simplicity. Here, the layers in the hierarchy are arranged in a Markov chain such that the variables at any layer are only influenced by the variables in the layer below and the layer above. Specifically, at the bottom layer 1803 for example, sequences of patches ($y_t$) extracted from fixed spatial locations spread across the entire 2D space of the video frames is fed as input to each first layer modules. On the other hand, the top-down predictions ($\hat{u}_t$) of the first layer causes coming from the second layer 1806 try to modulate the representations. The bidirectional nature of the model is apparent in FIG. 18, and in general there may be an extra top-down prediction as input to provide context for the analysis. Next, modifications will be included in the general equation to exploit this extra information.

With the parameters fixed, inferring latent variables at any intermediate layer involves obtaining useful representation of the data driven bottom-up information while combining the top-down influences from the higher layers. While the dynamic network at each layer try to extract useful information from the inputs for recognition, the top-down connections modulate the representations at each level with abstract knowledge from the higher layers. The top-down connections can "convey" contextual information to endow the model with a prior knowledge for extracting task specific information from noisy inputs. More formally, at any layer (l), the energy function that needs to be minimized to infer $x_t^{(l)}$ and $u_t^{(l)}$ is given by:

$$E(x_t^{(l)}, u_t^{(l)}, \theta^{(l)}) = \sum_{n=1}^{N} \left( \frac{1}{2} \| u_t^{(l-1,n)} - C^{(l)} x_t^{(l,n)} \|_2^2 + \lambda \| x_t^{(l,n)} - A^{(l)} x_{t-1}^{(l,n)} \|_1 + \sum_{k=1}^{K} \left| \gamma_{t,k}^{(l)} \cdot x_{t,k}^{(l,n)} \right| \right) + \beta \| u_t^{(l)} \|_1 + \frac{1}{2} \| u_t^{(l)} - \hat{u}_t^{(l+1)} \|_2^2 \quad (28)$$

$$\gamma_{t,k}^{(l)} = \gamma_0 \left[ \frac{1 + \exp(-[B^{(l)} u_t^{(l)}]_k)}{2} \right],$$

where $\hat{u}_t^{(l)} = C^{(l+1)} x_t^{(l+1)}$ is the top-down prediction of the causes coming from the state-space model in the layer above. This additional term involving $\hat{u}_t^{(l)}$ influences the representation at the (l)$^{th}$ layer by reducing the top-down prediction error. The goal is to match the representation of the inputs from the layer below with the belief of the layer above about the same representation.

Ideally, to perform inference in this hierarchical model, all the states and the causes are updated simultaneously depending on the present state of all the other layers until the model reaches equilibrium. However, such a procedure can be very slow in practice. Instead, an approximate inference procedure can be used with a single top-down flow of information and then a single bottom-up inference using this top-down information. Specifically, before the "arrival" of a new observation at time t, at each layer (l) (starting from the top-layer), the most likely causes are first propogated to the layer below using the state at the previous time instance $x_{t-1}^{(l+1)}$ and the predicted causes $\hat{u}_t^{(l+1)}$. More formally, the top-down prediction at layer l is obtained as:

$$\hat{u}_t^{(l)} = C^{(l)} \hat{x}_t^{(l)}$$

wherein $\hat{x}_t^{(l)} = \operatorname{argmin}_{x_t^{(l)}} \lambda^{(l)} \| x_t^{(l)} - A^{(l)} x_{t-1}^{(l)} \|_1 + \gamma_0 \sum_{k=1}^{K} |\hat{\gamma}_{t,k} x_{t,k}^{(l)}|$ and $\hat{\gamma}_{t,k} = (\exp(-[B^{(l)} \hat{u}_t^{(l+1)}]_k))/2.$ (29)

At the top most layer, L, a "bias" is set such that $\hat{u}_t^{(L)} = \hat{u}_{t-1}^{(L)}$, where the top-layer induces some temporal coherence on the final outputs. From EQN. (29), it can be shown that the predicted states for layer l can be obtained as:

$$\hat{x}_t^{(l)} = \begin{cases} [A^{(l)} x_{t-1}^{(l)}]_k, & \gamma_0 \gamma_{t,k} < \lambda^{(l)} \\ 0, & \gamma_0 \gamma_{t,k} \geq \lambda^{(l)} \end{cases}. \quad (30)$$

These predicted causes $\hat{x}_t^{(l)}$, $\forall l \in \{1, 2, \ldots, L\}$ are substituted in EQN. (28) and a single layer-wise bottom-up inference is performed as described above. Note that the additional term $$\frac{1}{2} \| u_t^{(l)} - \hat{u}_t^{(l+1)} \|_2^2$$

in the energy function only leads to a minor modification in the inference procedure, namely that this is added to $h(u_t)$ in EQN. (23). The combined prior now imposed on the causes, $$\beta \| u_t^{(l)} \|_1 + \frac{1}{2} \| u_t^{(l)} - \hat{u}_t^{(l+1)} \|_2^2,$$

is similar to an elastic net prior, leading to a smoother and biased estimate of the causes.

The ability of the DPCN model to learn complex features in the higher-layers of the model was tested. For this, a two layered network was trained from a natural video. Each frame in the video was first contrast normalized, and then the first layer of the model was trained on four overlapping contiguous 15×15 pixel patches from the video. The layer has 400 dimensional states and 100 dimensional causes. The causes pool the states related to the four patches. The separation between the overlapping patches here was 2 pixels, implying that the receptive field of the causes in the first layer was 17×17 pixels. Similarly, the second layer was trained on four causes from the first layer obtained from four overlapping 17×17 pixel patches from the video. The separation between the patches here is 3 pixels, implying that the receptive field of the causes in the second layer is 20×20 pixels. The second layer contains 200 dimensional states and 50 dimensional causes that pool the states related to the four patches.

Figure 19A:
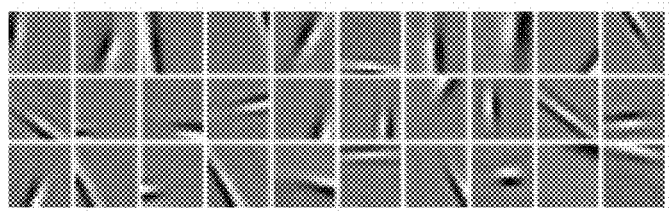
FIGS. 19A through 19C are visualizations of examples of receptive fields in accordance with various embodiments of the present disclosure.
Figure 19B:
Figure 19C:
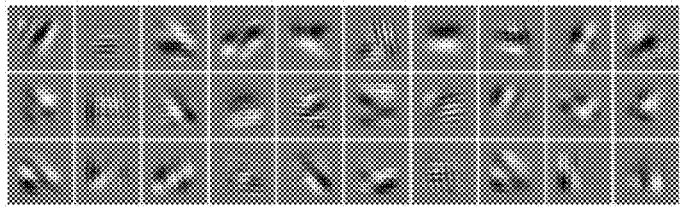

FIGS. 19A through 19C show visualizations of the receptive fields of the invariant units (columns of matrix B) at each layer when trained on natural videos. FIG. 19A shows the layer 1 states, FIG. 19B shows the layer 1 causes, and FIG. 19C shows the layer 2 causes. The receptive fields are constructed as a weighted combination of the dictionary of filters at the bottom layer. Each dimension of causes in the first layer represents a group of primitive features (like inclined lines) which are localized in orientation or position. Whereas, the causes in the second layer represent more complex features, like corners, angles, etc.

Figure 20A:
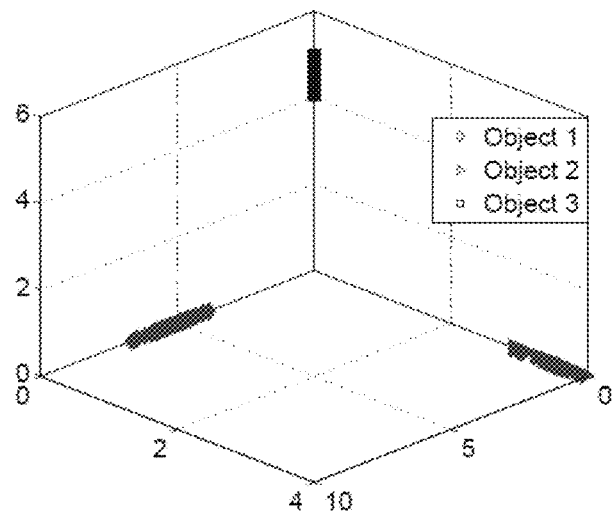
FIGS. 20A through 20C are examples of scatter plots illustrating object discrimination in accordance with various embodiments of the present disclosure.

Video sequences consisting of objects of three different shapes were constructed. FIG. 20A illustrates part of a clean video sequences constructed using three different shapes. The objective of the test is to classify each frame as coming from one of the three different classes. For this, several 100 frame long sequences (32×32 pixels) were made using two objects of the same shape bouncing off each other and the "walls". Several such sequences were then concatenated to form a 30,000 long sequence. A two layer network was then trained using this sequence. First, each frame was divided into 12×12 patches with neighboring patches overlapping by 4 pixels such that each frame was divided into 16 patches. The bottom layer was trained such that the 12×12 patches were used as inputs and were encoded using a 100 dimensional state vector. Four contiguous neighboring patches were pooled to infer the causes, which have 40 dimensions. The second layer was trained with 4 first layer causes as inputs, which were themselves inferred from 20×20 contiguous overlapping blocks of the video frames. The states here were 60 dimensional long and the causes had only three dimensions. Note that the receptive field of the second layer causes encompasses the entire frame.

Figure 20B:
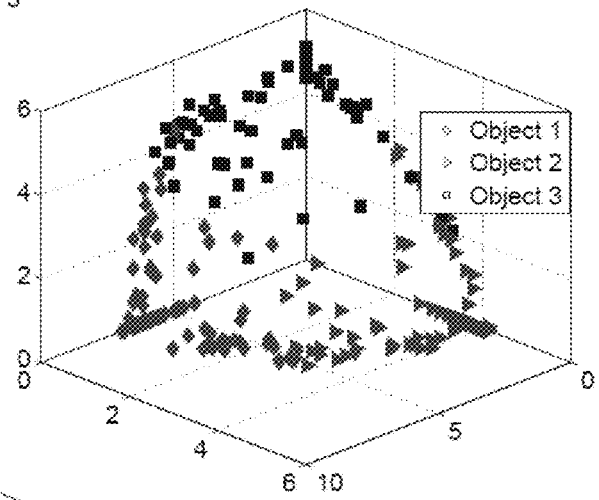

The performance of the DPCN was tested in two conditions. The first case was with 300 frames of clean video, with 100 frames per shape, constructed as described above. This was considered a single video without considering any discontinuities. In the second case, the clean video was corrupted with "structured" noise, where a number of objects were randomly picked from the same three shapes with a Poisson distribution (with mean 1.5) and independently added to each frame at random locations. There was no correlation between any two consecutive frames regarding where the "noisy objects" are added. FIG. 20B illustrates part of the corrupted video sequences constructed using three different shapes. Each row indicates one sequence.

Figure 20C:
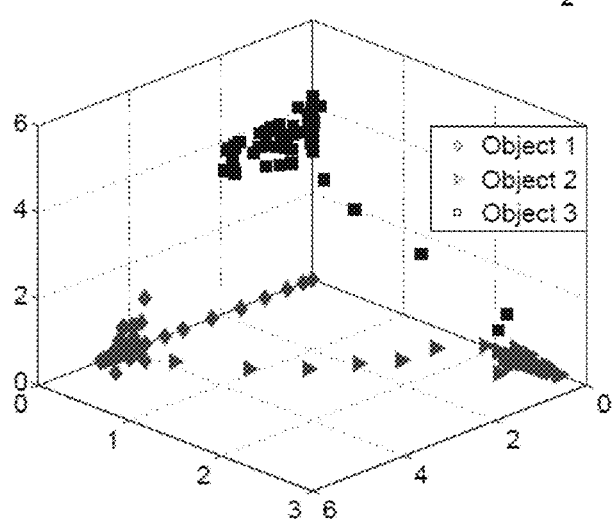

First, inference was performed on the clean video with only bottom-up inference, during which $\hat{u}_t^{(l)}, \forall l \in \{1,2\}$. FIG. 20A shows the scatter plot of the three dimensional causes at the top layer for the clean video with only bottom-up inference. Clearly, there are 3 clusters recognizing the three different shapes in the video sequence. FIG. 20B shows the scatter plot when the same procedure is applied on the corrupted (noisy) video with only bottom-up inference. It can be seen in FIG. 20B, that the 3 shapes cannot be clearly distinguished. Finally, top-down information along with the bottom-up inference is used on the noisy data. Since the second layer learned class specific information, the top-down information can help the bottom layer units to disambiguate the noisy objects from the true objects. FIG. 20C shows the scatter plot for the corrupted video with top-down flow along with bottom-up inference. In spite of largely corrupted sequence, it can be seen that with the top-down information, the DPCN is able to separate the frames belonging to the three shapes (the trace from one cluster to the other may be attributed to the temporal coherence imposed on the causes at the top layer.).

The deep predictive coding network (DPCN) is a generative model that empirically alters the priors in a dynamic and context sensitive manner. The DPCN model includes linear dynamical models with sparse states used for feature extraction, and top-down information to adapt the empirical priors. The dynamic DPCN model can capture the temporal dependencies and reduce the instability usually associated with sparse coding, while the task specific information from the top layers can help to resolve ambiguities in the lower-layer improving data representation in the presence of noise. The DPCN approach can be extended with convolutional methods, allowing implementation of high-level tasks like object recognition, etc., on large scale videos or images.

Figure 21:
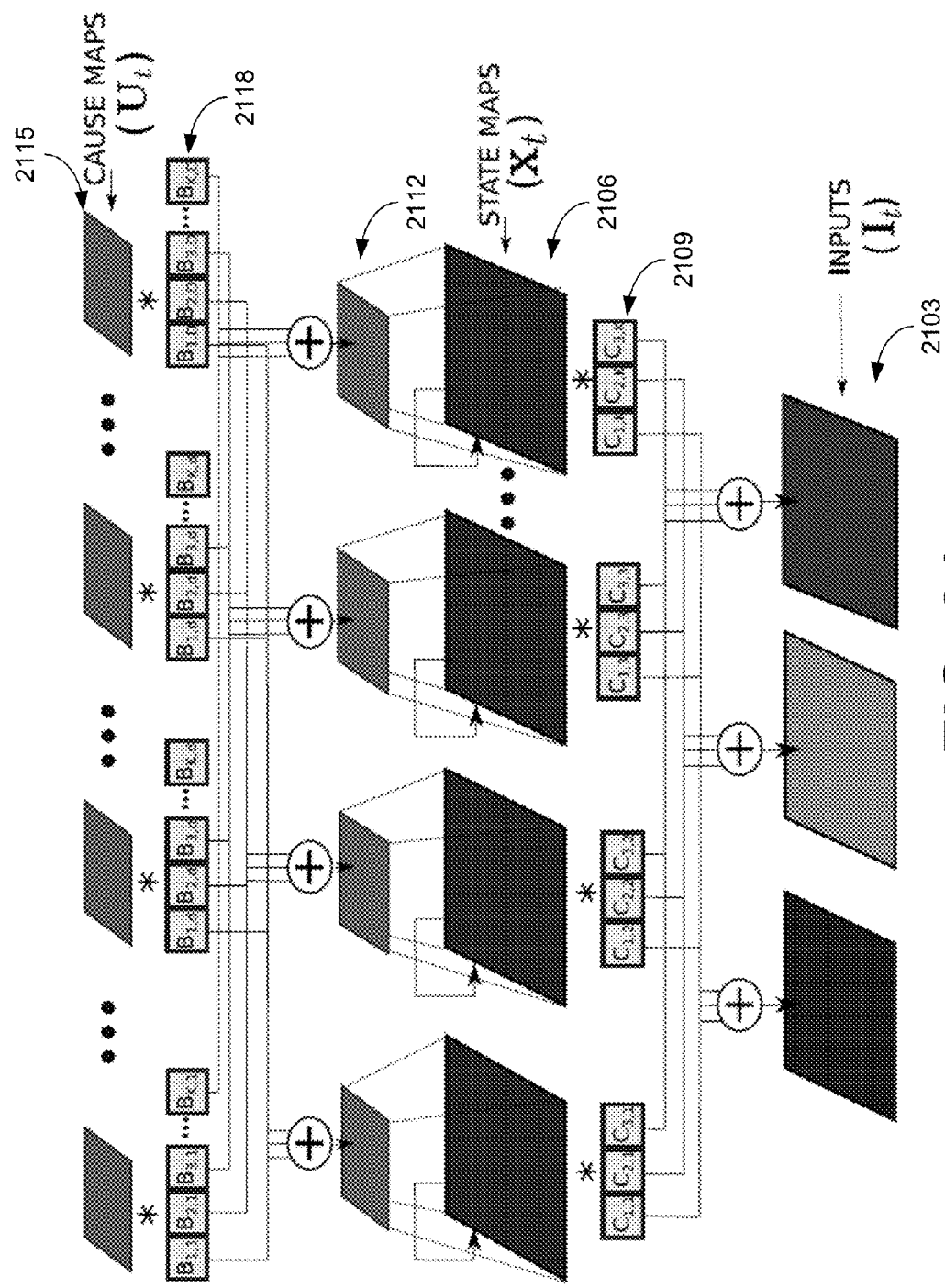
FIG. 21 is a block diagram illustrating an example of a single layer convolutional dynamic network (CDN) in accordance with various embodiments of the present disclosure.

A convolutional dynamic network (CDN) can combine the bottom-up, top-down and lateral (or temporal) influences that have been discussed for use in large scale object recognition. It can scale to large images/frames and learn decomposition of object parts in a hierarchical fashion. Referring to FIG. 21, shown is a block diagram of an example of a single layer convolutional dynamic network. In the example of FIG. 21, inputs 2103 contain 3 channels (e.g., RGB colors) and each channel 2103 is modeled as a combination of the state maps 2106 convolved with filters C 2109. The pooled state maps 2112 are decomposed using cause maps 2115 convolved with filters B 2118. During inference there is a two-way interaction between the state and the cause mappings through pooling/unpooling operations, which is left implicit here.

Consider using the single layer model of FIG. 21 to process a video sequence. The inputs/observations to the model are a sequence of video frames $I_t, \forall t \in \{1, 2, \ldots, T\}$ and each frame is composed of M color channels, denoted as $\{I_t^1, I_t^2, \ldots, I_t^M\}$. Assume that each channel $I_t^m$ is modeled as an observation to a state-space model, with the same set of states used across all the channels. Specifically, each channel $I_t^m$ is modeled as a linear combination of K matrices, $X_t^k, \forall k \in \{1, 2, \ldots, K\}$, convolved with filters $C_{m,k} \forall k$. The state space equations for this model can be written as:

$$I_t^m = \sum_{k=1}^K C_{m,k} * X_t^k + N_t^m \forall m \in \{1,2,\ldots,M\}$$

$$X_t^k(i,j) = \sum_{\tilde{k}=1}^K a_{k,\tilde{k}} X_{t-1}^{\tilde{k}}(i,j) + V_t^k(i,j), \quad (31)$$

where * denoted convolution. If $I_t^k$ is a w×h frame and $C_{m,k}$ is a s×s pixel filter, then $X_t^k$ is a matrix of size (w+s−1)× (h+s−1). $X_t = \{X_t^k\} \forall k$ is referred to as state maps (or sometimes simply as states). Also, $\alpha_{k,\tilde{k}}$ indicates the lateral connections between the state maps over time. For object recognition, assume that:

$$a_{k,\tilde{k}} = \begin{cases} 1, & k = \tilde{k} \\ 0, & \text{otherwise} \end{cases}. \quad (32)$$

Considering only self-recurrent connections between state maps encourages temporal coherence. However, the motion in the input sequences can be modeled by alternatively learning the coefficients $\alpha_{k,\tilde{k}}$ along with the rest of the model parameters.

Since EQN. (31) is an under-determined model, it can be regularized with a sparsity constraint on the states to obtain a unique solution. Hence, the combined energy function for the state-space model in EQN. (31) can be written as follows:

$$E_x(X_t,C) = \sum_{m=1}^M \|I_t^m - \sum_{\tilde{k}=1}^K C_{m,k} * X_t^k\|_2^2 + \lambda \|X_t - X_{t-1}\|_1 + \sum_{k=1}^K \gamma_k \cdot |X_t^k|. \quad (33)$$

Note that the state transition noise $V_t$ in EQN. (31) is also considered to be sparse, so that it is consistent with the sparsity of the states. This makes practical sense, as the number of changes between two consecutive frames in a typical video sequence is small.

In EQN. (33), $\gamma_k$ is a sparsity parameter on the kth state map. Instead of assuming that the sparsity of the states is constant (or that the prior distribution over the states is stationary), the cause maps (or causes) $U_t$ are considered to modulate the activity of the states through the sparsity parameter, and the sparsity parameter $\gamma \in \mathbb{R}^{(w+s-1)\times(h+s-1)\times K}$ in terms of the causes $U_t \in \mathbb{R}^{(w+s-p)\times(h+s-p)\times D}$ is considered as:

$$\gamma_k = \frac{\gamma_0}{2}\left(1 + \exp\left\{-\sum_{d=1}^D B_{k,d} * U_t^d\right\}\right) \quad (34)$$

where $\gamma_0 > 0$ is a constant. This non-linear multiplicative interaction between the state and the cause mappings leads to extracting information that is invariant to several transformations from the inputs. Essentially, through the filters $B_{k,d} \in \mathbb{R}^{p \times p}$, $U_t^d$ learn to group together the states that co-occur frequently. Since co-occurring components typically share some common statistical regularity, such activity typically leads to locally invariant representation. More importantly, unlike many other deep learning methods, the activity of the causes influences the states directly through the top-down connections ($B_{k,d}$) and the statistical grouping is learned from the data, instead of a pre-determined topographic connections.

Given fixed state maps, the energy function that can be minimized to obtain the causes is:

$$E_u(U_t, B) = \sum_{k=1}^{K} \frac{\gamma_0}{2}(1 + \exp\{-\sum_{d=1}^{D} B_{k,d} * U_t^d\} \cdot |X_t^k|) + \beta \|U_t\|_1 \quad (35)$$

where the solution is regularized using an $l_1$ sparsity penalty. Note that all the elements of B are initialized to be non-negative and they remain so without any additional constraint. This ensures that the gradient of the smooth part (or the first term) of $E_u(\cdot)$ is Lipschitz continuous, allowing proximal methods to be used to infer $U_t$ with guaranteed convergence.

Several of these single-layer models can be stacked to form a hierarchical model. The outputs (or cause maps) from one layer act as input to the layer above. However, each layer gets, along with the bottom-up inputs, top-down predictions of its output causes. The goal during inference of the states and the causes at any layer is to produce representations that best predict the inputs while reducing the top-down prediction error. More formally, by combining the top-down predictions into the single layer model, the energy function at the $l^{th}$ layer in the hierarchical model can be written as:

$$E_l(X_t^l, U_t^l, C^l, A^l, B^l) = \sum_{m=1}^{D_{l-1}} \|U_t^{m,l-1} - \sum_{k=1}^{K} C_{m,k}^l * X_t^{k,l}\|_2^2 + \lambda^l \|X_t^l - X_{t-1}^l\|_1 + \sum_{k=1}^{K} \gamma^k \cdot |X_t^{k,l}| + \beta^l \|U_t^l\|_1 + \eta^l \|U_t^l - \tilde{U}_t^l\|_2^2 \quad (36)$$

$$\gamma^k = \frac{\gamma_0}{2}(1 + \exp\{-\sum_{d=1}^{D_l} B_{k,d}^l * U_t^{d,l}\}),$$

where $U_t^{l-1}$ are the causes coming from the layer below and $\tilde{U}_t^l$ is the top-down prediction coming from the state-space model in the layer above. As indicated by the energy function in EQN. (36), the architecture at each layer is similar to the single layer model described before, though the number of states ($K^l$) and causes ($D^l$) might varying over the layers.

To make the implementation more efficient, some restrictions can be introduced on the architecture. First, sparse connectivity is assumed between both the inputs and states and also, between states and causes. This not only increases the efficiency during inference but also breaks the symmetry between layers and helps to learn complex relationships. Second, the size of the states is shrunk using max pooling between the states and the causes. Correspondingly, the sparsity parameters ($\gamma$) obtained from the causes can be unpooled during inference of the states. This reduces the size of the inputs going into the higher layers and hence, is more efficient during inference. Also, the pooling can produce better invariant representations.

At any layer l, inference involves finding the states $X_t^l$ and the causes $U_t^l$ that minimizes the energy function $E_l$ in EQN (36). To perform this joint inference, the states can be alternately updated with the causes fixed, and then the causes updated with the states fixed until convergence. Updating either of them involves solving an $l_1$ convolutional sparse coding problem. A proximal gradient based method called FISTA (and some variations) can be used for this, where each update step involves computing the gradient, followed by a soft thresholding function to obtain a sparse solution.

Referring to FIG. 22, shown is an example of an algorithm involving the iterative inference procedure. With the causes fixed, updating the states involves finding the gradient of all the terms other than the sparsity penalty in $E_l$ w.r.t $X_t^l$. For convenience, these terms can be re-written as:

$$h(X_t^l) = \sum_{m=1}^{D_{l-1}} \|U_t^{m,l-1} - \sum_{k=1}^{K_l} C_{m,k}^l * X_t^{k,l}\|_2^2 + \lambda \|X_t^l - X_{t-1}^l\|_1. \quad (37)$$

Since $h(X_t^l)$ is non-smooth, the second term involving state transitions has an $l_1$ penalty, where it is not possible to find its exact gradient. However, in order to approximately compute it, Nestrov's smoothness can be used to approximate the non-smooth state transition term in $h(X_t^l)$ with a smooth function.

To begin, let $\Omega(X_t^l) = \|e_t\|_1$ where $e_t = \|vec(X_t^l) - vec(X_{t-1}^l)\|_1$. The idea is to find a smooth approximation to this function $\Omega(X_t^l)$ with a smooth function and compute its gradient with respect to $e_t$. Since $e_t$ is a linear function of $X_t^l$, computing the gradient of $\Omega(X_t^l)$ w.r.t. $X_t^l$ becomes straight forward. Now, $\Omega(X_t^l)$ can be rewritten using the dual norm of $l_1$ as:

$$\Omega(X_t^l) = \mathrm{argmax}_{\|\alpha\|_\infty \leq 1}[\alpha^T e_t], \quad (38)$$

where $\alpha \in \mathbb{R}^{\mathrm{card}(e_t)}$. Using Nestrov's smoothness property, $\Omega(X_t^l)$ can be approximated with a smooth function of the form:

$$\Omega(X_t^l) \approx f_\mu(e_t) = \mathrm{argmax}_{\|\alpha\|_\infty \leq 1}[\alpha^T e_t - \mu d(\alpha)], \quad (39)$$

where $$d(\alpha) = \frac{1}{2}\|\alpha\|_2^2$$

is a smoothness function and $\mu$ is a smoothness parameter.

Following Theorem 1 in "Smoothing proximal gradient method for general structured sparse regression" by Chen et al. (*The Annals of Applied Statistics*, 6(2):719-752, June 2012), it can be shown that $f_\mu(e_t)$ is convex and smooth and, moreover, the gradient of $f_\mu(e_t)$ w.r.t. $e_t$ takes the form:

$$\nabla_{e_t} f_\mu(e_t) = \alpha^*, \quad (40)$$

where $\alpha^*$ is the optimal solution to EQN. (39). A closed-form solution to $\alpha^*$ can be obtained as:

$$\alpha^* = S\left(\frac{e_t}{\mu}\right), \quad (41)$$

where $S(\cdot)$ is a projection operator applied over every element in $\alpha^*$ and is defined as follows:

$$S(x) = \begin{cases} x, & -1 \leq x \leq 1 \\ 1, & x > 1 \\ -1, & x < -1 \end{cases} \quad (42)$$

Using the chain rule, $f_\mu(e_t)$ is also convex and smooth in $X_t^l$ and its gradient $\nabla_{X_t^l} f_\mu(e_t)$ remains the same as in EQN. (40).

Given this smooth approximation of the non-smooth state transition term and its gradient, the iterative shrinkage-thresholding algorithm can be applied for the convolutional states-space model with a sparsity constraint. The gradient of re-formulated $h(X_t^l)$ w.r.t $X_t^l$ is given as follows:

$$\nabla_{X_t^{k,l}} h(X_t^l) = -\sum_{m=1}^{D_{l-1}} \tilde{C}_{k,m} * (U_t^{m,l-1} - \sum_{k=1}^{K_l} C_{k,m} * X_t^{k,l}) + \lambda M_{\alpha^*}^k, \quad (43)$$

where $\tilde{C}_{k,m}$ indicates that the matrix $C_{k,m}$ is flipped vertically and horizontally and $M_{\alpha^*}^k$ is the $\hat{k}^{th}$ map from a matrix obtained by reshaping $\alpha^*$. Once the gradient is obtained, the states can be updated as:

$$X_t^l = X_t^l - \gamma^l \tau \nabla_{X_t^l} h(X_t^l), \quad (44)$$

where $\tau$ is a step size for the gradient descent update. FISTA uses a momentum term during the gradient update, which least to faster convergence. Following this, the updated states pass through a soft thresholding function that clamps the smaller values, leading to a sparse solution.

$$X_t^l = \text{sign}(X_t^l)(\max|X_t^l| - \gamma^l). \quad (45)$$

A spatial max pooling is performed over small neighborhoods across the 2D state maps as:

$$[\text{down}(X_t^{k,l}), p_t^{k,l}] = \text{pool}(X_t^{k,l}), \quad (46)$$

where $p_t^{k,l}$ indicates the pooling indexes. The number of state maps remains the same, while the resolution of each map decreases (denoted as $\text{down}(X_t^{k,l})$). Non-overlapping spatial windows are used for the pooling operation.

Similar to the state updates described above, the states are fixed and the gradient computed using only the smooth part of the energy function $E_l$ (denoted as $h(U_t^{k,l})$) w.r.t. $U_t^l$. Given the pooled states, the gradient can be computed as follows:

$$\nabla_{U_t^{d,l}} h(U_t^l) = -\frac{\gamma_0}{2} \sum_{k=1}^{K_l} \tilde{B}_{k,d} * \quad (47)$$
$$\left[ \left( \exp\left\{ -\sum_{d=1}^{D_l} B_{k,d}^l * U_t^{d,l} \right\} \right) \cdot |\text{down}(X_t^{k,l})| \right] + 2\eta(U_t^{d,l} - \hat{U}_t^{d,l}).$$

Similar to the state updates described above, using this gradient information, the causes are updated by first taking a gradient step, followed by a soft thresholding function:

$$U_t^l = U_t^l - \beta^l \tau \nabla_{U_t^l} h(U_t^l)$$

$$U_t^l = \text{sign}(U_t^l)(\max|U_t^l| - \beta^l). \quad (48)$$

After updating the causes, the sparsity parameter $\gamma$ is re-evaluated for the next iteration. This can be done as follows:

$$\gamma^k = \frac{\gamma_0}{2}\left(1 + \exp\left\{-\text{unpool}_{p_t^k}\left(\sum_{d=1}^{D_l} B_{k,d}^l * U_t^{d,l}\right)\right\}\right) \quad (49)$$

where $\text{unpool}_{p_t^{k,l}}(\cdot)$ indicates reversing the pooling operation using the indexes $p_t^{k,l}$ obtained during the max pooling operation described above. Note that, while the inputs to the pooling operation are the inferred states, the inputs to the unpooling operations are the likely states "generated" by the causes.

A single iteration includes the above mentioned steps: update the states using a single FISTA step, perform max pooling over the states, update the causes using a single FISTA step and, finally, re-evaluate the sparsity parameter for the next iteration. All the computations during inference involve only basic operations such as convolution, summation, pooling and unpooling. All of these can be efficiently implemented on a GPU with parallalization, making the overall process very quick.

In the inference procedure described above, while updating the causes, the top-down predictions $\hat{U}_t^l$ are assumed to be already available and constant throughout the inference procedure. However, ideally, this should not be the case. Since the layers are arranged in a Markov chain, all the layers can be concurrently updated, while passing top-down and bottom-up information, until the system reaches an equilibrium. In practice, this can be very slow to converge. In order to avoid this, an approximate inference is done, where a single approximate top-down prediction is made at each time step using the states from the previous time instance and a single bottom-up inference is performed with fixed top-down predictions, starting from the bottom layer.

More formally, at every time step, using the state-space model at each layer we predict the most likely cause at the layer below ($\hat{U}_t^{m,l-1}$), given only the previous states and the predicted causes from the layer above. Mathematically, the top-down prediction at layer l can be written as:

$$\hat{U}_t^{m,l-1} = \sum_{k=1}^{K_l} C_{m,k}^l * \hat{X}_t^{k,l} \forall m \in \{1, 2, \ldots D_{l-1}\} \quad (50)$$

where $\hat{X}_t^l = \text{argmin}_{X_t^l} \lambda^l \|X_t^l - X_{t-1}^l\|_1 + \hat{\gamma} \cdot \|X_t^l\|_1$ and $\hat{\gamma}^k = \frac{\gamma_0}{2}\left(1 + \exp\left\{-\text{unpool}_{p_{t-1}^{k,l}}\left(\sum_{d=1}^{D_l} B_{k,d}^l * \hat{U}_t^{d,l}\right)\right\}\right)$, and $\hat{U}_t^l$ itself is a top-down prediction coming from layer l+1. At the top-layer, the output from the previous time is considered as the predicted causes, with $\hat{U}_t^L = U_{t-1}^L$, allowing temporal smoothness over the outputs of the model. A simple analytic solution can be obtained for $\hat{X}_t^l$ in EQN. (50) as:

$$\hat{X}_t^{k,l}(i,j) = \begin{cases} \hat{X}_{t-1}^{k,l}(i,j) & \hat{\gamma}^k(i,j) < \lambda^l \\ 0, & \hat{\gamma}^k(i,j) \geq \lambda^l \end{cases}. \quad (51)$$

Figure 23:
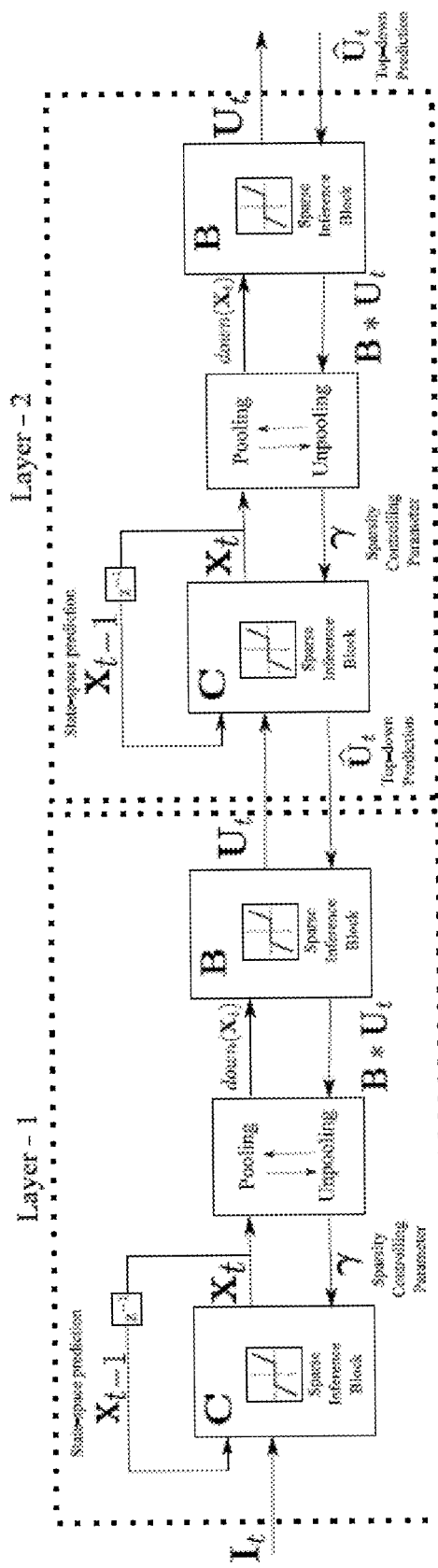
FIG. 23 is a block diagram illustrating an example of the flow of bottom-up and top-down information in accordance with various embodiments of the present disclosure.

Referring to FIG. 23, shown is a block diagram of an example of the inference, with arrows indicating the flow of information. In the example of FIG. 23, the block diagram is a two-layered network indicating the flow of information during inference. The prior (or the regularization term) on the causes in the hierarchical model of EQN. (36) involves two terms: an $l_1$ regularization encouraging sparsity and $l_2$ term with a bias coming from the top-down predictions. This resembles elastic net regularization, albeit with a bias. Next, the role of top-down predictions during inference can be observed through EQNS. (47) and (51). It can be seen that they play a dual role of driving and as well as modulatory signals. While in the former the predictions $\hat{U}_t^l$ drives the representations through the gradient and bias them to some top-down expectations, in EQN. (51) they "shut" some of the state elements while performing top-down predictions and hence, act as a modulatory signal.

Also, at any layer the mapping between the inputs and the output causes is highly non-linear. This non-linearity may be attributed to several factors: (i) the thresholding function while updating the states and the causes; (ii) the pooling operation; and (iii) the causes and the states interact through an exponential function as shown in EQN. (47).

During learning the goal is to estimate the filters across all the layers in the model, such that they capture the structure across the entire observation sequence $\{I_1, I_2, \ldots I_T\}$. This can be done in a greedy layer-wise fashion, where the parameters of one layer are estimated at a time, starting from the bottom layer. At any layer l, the objective is to minimize the cost function $E_l(\bullet)$ in EQN. (36) by alternating between inferring the representations (both the states and the causes) and updating the parameters. Note that during learning, top-down connections are not considered by setting $\eta^l = 0 \forall l$ in EQN. (36) while inferring the representations.

At layer l, after inferring $X_t^l$ and $U_t^l$ and fixing them, the filters $C^l$ and $B^l$ are updated using gradient descent (with momentum) minimizing the cost function $E_l(\bullet)$. The gradient of $E_l(\bullet)$ with respect to $C^l$ can be computed as:

$$\nabla_{C_{m,k}^l} E_l = -2\tilde{X}_t^{l,k,l} * (I_t^m - \Sigma_{k=1}^{Kl} C_{k,m}^l * X_t^{l,k,l}), \quad (52)$$

and the gradient of $E_l(\bullet)$ with respect to $B^l$ can be computed as:

$$\nabla_{B_{k,d}^l} E_l = -\tilde{U}_t^{l,d,l*}[(\exp\{-\Sigma_{d=1}^{Dl} B_{k,d}^l * U_t^{d,l}\}) \cdot | \\ \text{down}(X_t^{l,k,l})|]. \quad (53)$$

After updating the filters, each filter is normalized to be of unit norm to avoid a trivial solution.

The performance of the CDN model was tested on various tasks: (i) its ability to learn hierarchical representations and objects parts from unlabeled video sequences; (ii) object recognition with contextual information; (iii) sequential labeling of video frames for recognition; and (iv) its robustness in noisy environment. In all tests, the same pre-processing was performed on the inputs. Each frame in a video sequence (or each image) was converted into gray-scale. Then each frame normalized to be zero mean and unit norm, followed by local contrast normalization. The feature vectors used for classification tasks were a vectorized form of the causes extracted from the video frames. Also, different kinds of pooling were sometimes used on the causes depending on the dataset before feeding it to the classifier. Given these feature vectors, a linear L2-SVM (e.g., a LibLinear package) was used for all the classification tasks.

Figure 24A:
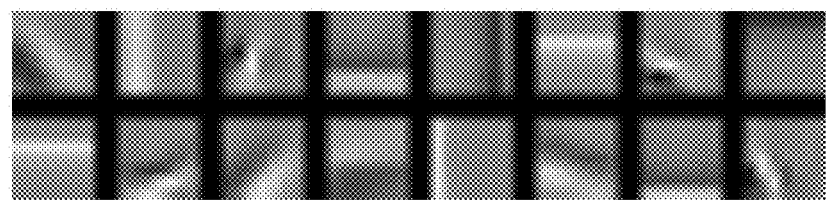
FIGS. 24A and 24B are visualizations of examples of receptive fields in accordance with various embodiments of the present disclosure.
Figure 24B:
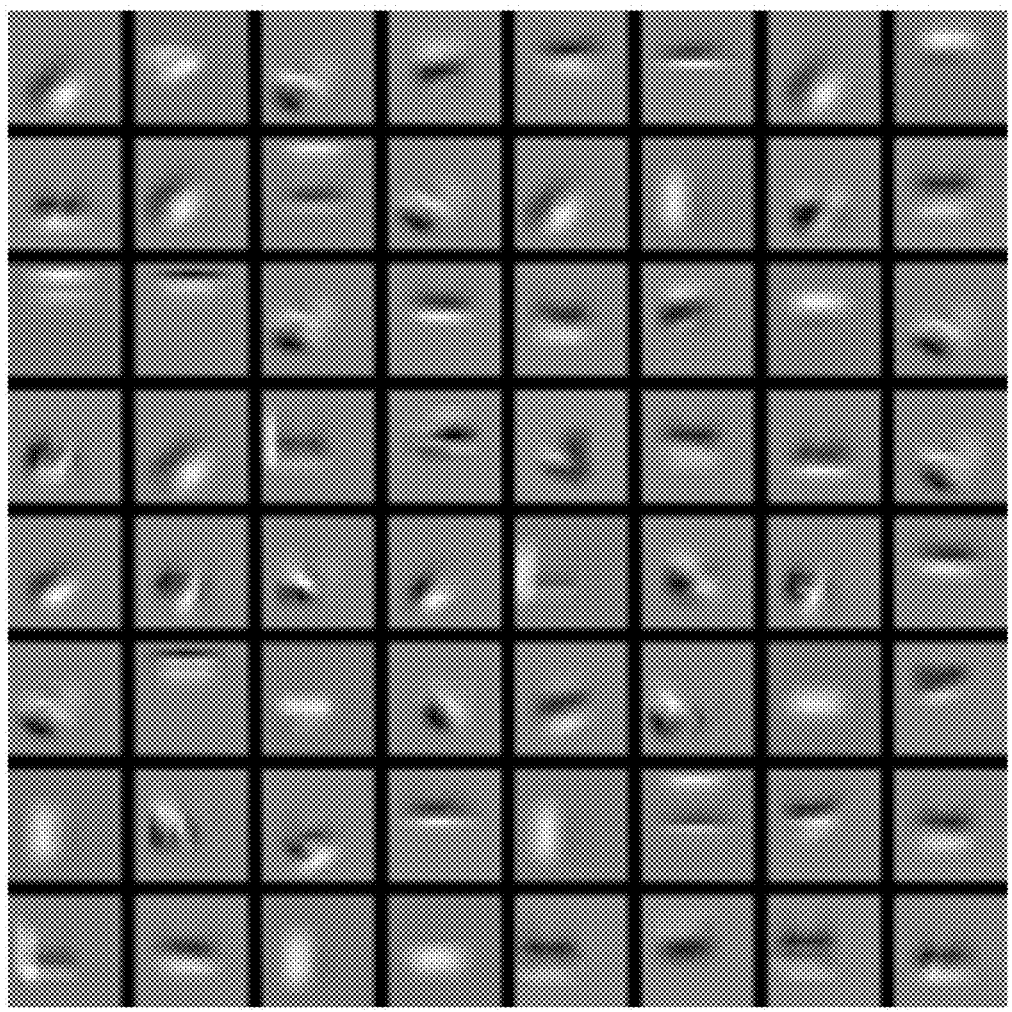

To visualize what internal representations the model can learn, a two layered network was implemented using the Hans van Hateren natural scene videos. Each frame was 128×128 pixels in size and pre-processed as described above. The first layer included 16 states of 7×7 filters and 32 causes of 6×6 filters, while the second layer was made up of 64 states of 7×7 filters and 128 causes of 6×6 filters. The pooling size between the states and the causes for both the layers is 2×2. FIGS. 24A and 24B show examples of the receptive fields of the first layer states and the second layer causes. It can be seen that the receptive fields of the first layer states (FIG. 24A) resemble simple oriented filters, similar to those obtained from sparse encoding methods. The receptive fields of the second layer causes, as shown in FIG. 24B, contains more complex structures like edge junctions and curves. These are constructed as weighted combination of the lower layer filters.

One advantage of a distributive model is its ability to "transfer" the model learned on unlabeled data to extract features for generic object recognition, the so called self-taught learning. This was used to access the quality of the learning procedure and perform object recognition in static images from the Caltech-101 dataset. Each image in the dataset was re-sized to be 152×152 (zero padded to preserve the aspect ratio) and pre-processed as described above.

The same two-layered model was used to learn from natural videos sequences as above and extract features for each image using a single bottom-up inference (without any temporal or top-down information by setting $\lambda=0$ and $\eta=0$ for both the layers in EQN. (36)). The output causes from layer 1 and layer 2 were taken and made into a three level spatial pyramid for each layer output. They were then concatenated to form a feature vector for each image and fed as inputs to linear classifier. TABLE 3 shows the classification performance results over Caltech-101 dataset (with only a single bottom-up inference) obtained when 30 images per class were used for training and testing, following the standard protocol, and averaged over 10 runs. The parameters of the model were set through cross validation. It was observed that using layer 1 causes alone led to an accuracy of 62.1%, while using the causes from both the layers improved the performance to 66.9%. These results are comparable to other similar methods that use convolution architecture and slightly better than using hand-designed features like SIFT.

TABLE 3

| Methods | Accuracy |
| --- | --- |
| Tested Method—Layer 1 (CDN) | 62.1 ± 1.1% |
| Tested Method—Layer 1 + 2 (CDN) | 66.8 ± 0.5% |
| Layer 1 + 2 (DN) | 66.9 ± 1.1% |
| Layer 1 + 2 (CDBN) | 65.4 ± 0.5% |
| (ConvPSD) | 65.7 ± 0.7% |
| Layer 1 + 2 (ConvFA) | 65.7 ± 0.7% |
| (PSD) | 65.6 ± 1.0% |
| (Macrofeatures) | 70.9 ± 1.0% |
| (SPM) | 64.6 ± 0.7% |

Visual perception is not static and uses contextual information from both space and time. The CDN model can effectively utilize this contextual information and produce a robust representation of the objects in video sequences. While the temporal relationships are encoded through the state-space model at each layer, the spatial context modulates the representation through two different mechanisms: (i) spatial convolution along with sparsity ensures that there is competition between elements, leading to some kind of interaction across space; and (ii) the top-down modulations coming from higher-layer representations, which first accumulates information from the lower-layers and then tries to predict the response over a larger receptive fields.

In order to test this, the performance of the model was examined over two different tasks. First, it was shown that using contextual information during inference can lead to a consistent representation of the objects, even in cases where there are large transformations of the object over time. The COIL-100 dataset (see examples of FIG. 6A) was used for this task. Second, the model was used for sequence labeling task, where a class was assigned to each frame in sequence before classifying the entire sequence as a whole. The goal was to show the extent of invariance the model can encode, particularly in cases of corrupted inputs. The performance was tested on the Honda/UCSD face video dataset, on both clean as well as corrupted sequences.

For this test, the COIL-100 dataset, which contains 100 different objects (or classes), was considered. For each object there was a sequence obtained by placing the object on a turn table and taking a picture for every 5 degree turn, resulting in 72 frame long video per object. Each frame was re-sized to be 128×128 pixels in size and pre-processed as described above. The same two-layered network described above was used to perform inference with top-down connections over each of the sequences. The causes were combined from both the layers for each frame and used it to train a linear SVM for classification. Four frames per object at viewing angles 0°, 90°, 180°, 270° were considered as labeled data used for training the classifier and the rest are used for testing. Note that access to the test samples is assumed during training. This resembles a "transductive" learning setting.

The CDN method was compared with other deep learning models—a two stage hierarchical model built using more biologically possible feature detectors called view-tuned network (VTU), stacked independent subspace analysis learned with temporal regularization (Stacked ISA+Temporal) and convolutional networks trained with temporal regularization (ConvNet+Temporal). While the first two methods do not utilize the contextual information during training the classifier, the third method uses a similar setting where the entire object sequence is considered during training. Also, three different settings were considered during inference in the CDN model: (i) each frame processed independently and does not consider any contextual information with no temporal or top-down connections, (CDN without context); (ii) with only temporal connections (CDN+temporal (no top down)); and (iii) with both the temporal and top-down connections (CDN+temporal+top down).

TABLE 4

| Methods | Accuracy |
| --- | --- |
| View-tuned network (VTU) | 79.10% |
| Stacked ISA + temporal | 87.00% |
| ConvNets + temporal | 92.25% |
| CDN without context | 79.45% |
| CDN + temporal (no top down) | 94.41% |
| CDN + temporal + top down | 98.34% |

As shown in TABLE 4, the CDN method performed much better than the other methods when contextual information was used. While using temporal connections itself proved sufficient to obtain good performance, having top-down connections improved the performance further. On the other hand, not using any contextual information led to a significant drop in performance. Also, the model learned on video sequences completely unrelated to the task, indicating that the contextual information during inference is more important than using it for just training the classifier. The reason for this may be attributed to the fact that the contextual information might push the representations from each sequence into a well-defined attractor, separating it from other classes.

Figure 25A:
FIGS. 25A through 25C are examples of video face sequences face sequences in accordance with various embodiments of the present disclosure.
Figure 25B:
Figure 25C:
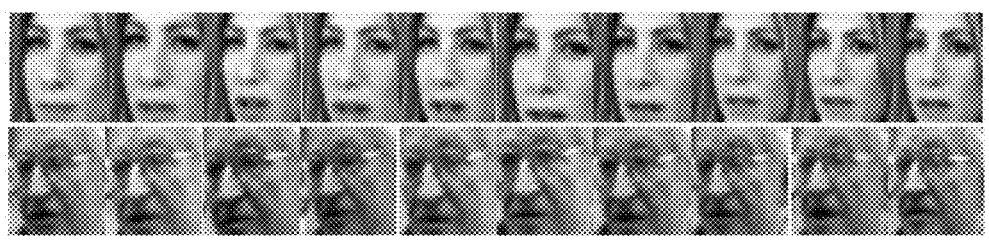

While the above experiment shows the role of context during inference, it does not tell much about the discriminability of the model itself. For this, the performance of the CDN model was tested for a sequence labeling task, where the goal was to classify a probe sequence given a set of labeled training sequences. Face recognition was tested on the Honda/UCSD dataset and the YouTube celebrities dataset. The Honda dataset contains 59 videos of 20 different subjects, while the YouTube dataset contains 1910 videos of 47 subjects. While the Honda dataset is obtained from a controlled environment, the YouTube dataset is obtained from more natural setting, with very noisy and low-resolution videos, making the task very challenging. FIG. 25A shows examples of face sequences belonging to three different subjects extracted from the Honda/USCD dataset (after histogram equalization). FIG. 25B shows some example videos from the YouTube celebrities dataset and FIG. 25C shows examples of face sequences extracted from the videos.

From every video, faces from each frame were detected using Voila-Jones face detection and then re-sized to be 20×20 pixels for the Honda dataset and 30×30 pixels for the YouTube dataset. FIGS. 25A and 25C show examples of the face sequences obtained from the Honda and the YouTube datasets, respectively. Each set of faces detected from a video are then considered as an observation sequence. Next, in addition to the pre-processing described above, histogram equalization was performed on each frame to remove any illumination variations. Finally, for the Honda dataset 20 face sequences were considered for training and the remaining 39 sequences for testing. The results are reported using varying numbers of frames per sequence (N): 50; 100; and full length. When the length of the sequence is less than N, then all the frames in the sequence were used. In the YouTube dataset, the dataset was randomly partitioned into 10 subsets of 9 videos each, then each subset was divided into 3 videos for training, and the remaining 6 for testing. The average performance is reported over all the 10 subsets.

For the Honda dataset, 20 training sequences were used to learn a two-layered network, with the first layer made up of 16 states and 48 causes and the second layer made up of 64 states and 100 causes. All the filters were of 5×5 in size and the pooling size in both the layers was 2×2. A similar architecture was used for the YouTube dataset, but with filter size of 7×7 and the model parameters are learned by randomly sampling from the all the sequences in the dataset. The learning was completely unsupervised. During classification, for the Honda dataset, the inferred causes from both the layers for each frame were concatenated and used as feature vectors. On the other hand, for the YouTube dataset, a 3-level spatial pyramid of the causes was made from both the layers and used as a feature vector. Any probe sequence was assigned a class based on the maximally polled predicted label across all the frames. All the parameters were set after performing a parameter sweep to find the best performance. On the YouTube dataset, the parameter sweep was done on a single subset and the same parameters are used for the rest of the subsets.

TABLE 5

| Sequence Lengths/ Methods | 50 frames | 100 frames | Full length | Average |
| --- | --- | --- | --- | --- |
| MDA | 74.36 | 94.87 | 97.44 | 88.89 |
| AHISD | 87.18 | 84.74 | 89.74 | 87.18 |
| CHSID | 82.05 | 84.62 | 92.31 | 86.33 |
| SANP | 84.62 | 92.31 | 100 | 92.31 |
| DFRV | 89.74 | 97.44 | 97.44 | 94.87 |
| CDN w/o context | 89.74 | 97.44 | 97.44 | 94.87 |
| CDN with context | 92.31 | 100 | 100 | 97.43 |

TABLE 5 summarizes the results obtained on the Honda/UCSD dataset. The CDN method was compared with manifold discriminant analysis (MDA), set based face recognition methods (AHISD and CHSID), sparse approximated nearest points (SANP) and dictionary-based face recognition from video (DFRV). The CDN with context clearly outperformed all the methods, across all the sequence lengths considered. Also note that the performance of the CDN model droped when temporal and top-down connniptions are not considered (CDN w/o context).

On the YouTube dataset, the CDN method was compared in addition to SANP and MDA, with other methods that use covariance features (COV+PLS), and kernel learning (COV+KL and Proj.+KL). As shown TABLE 6, the CDN model was competitive with the other state-of-the-art methods. Note that most of the methods mentioned above (particularly, COV+PLS, Porj.+PLS and COV+KL) consider all the frames in the sequence to extract features before performing classification. On the other hand, a sequential labeling was performed for CDN, utilizing knowledge only from the past frames to extract the features. Also, without either the temporal or top-down connections, the performance of the CDN method again drops to around 69.5% (CDN w/o context).

TABLE 6

| Methods | Accuracy |
| --- | --- |
| MDA | 65.3% |
| SANP | 68.4% |
| COV + PLS | 70.0% |
| COV + KL | 73.2% |
| Proj. + KL | 70.8% |
| CDN w/o context | 69.5% |
| CDN with context | 71.4% |

Figure 26A:
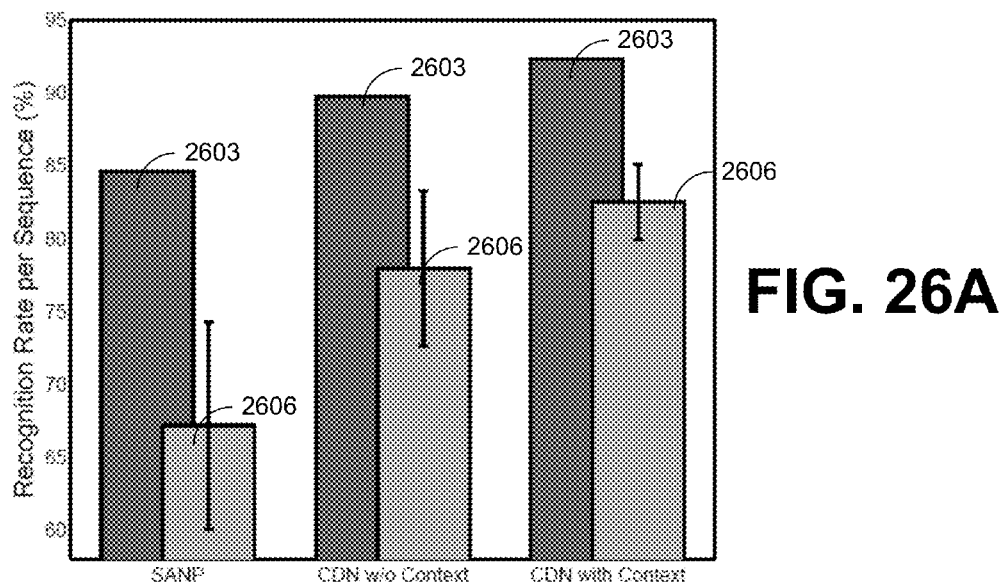
FIGS. 26A-26B and 27A-27D are examples of plots illustrating recognition rates of CDN in accordance with various embodiments of the present disclosure.
Figure 26B:
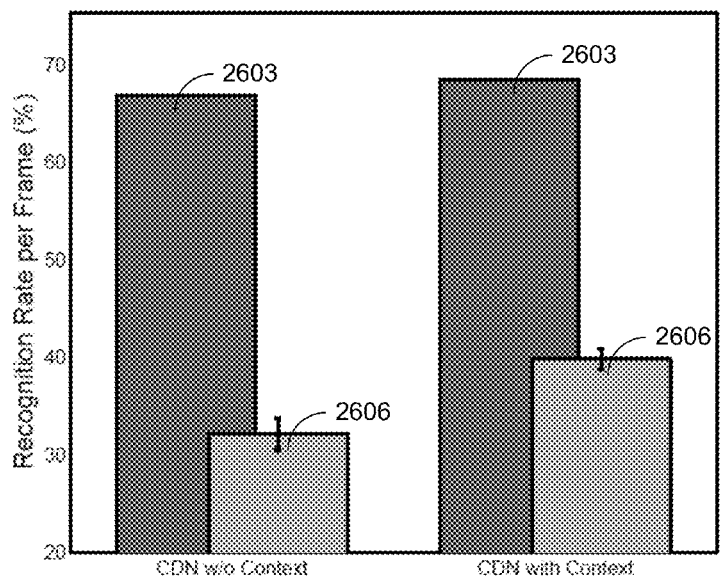

To evaluate the performance of the model with a noisy observation, the Honda/UCSD sequences were corrupted with some structured noise in the above experiment (but maintained the same parameters learned from clean sequences). The noisy sequence was made as follows: one-half of each frame of all the sequences was corrupted by adding one-half of a randomly chosen frame of random subject. This was repeated a number of times per frame (the number was based on a Possion distribution with mean 2). FIGS. 26A and 26B summarize the classification results on the noisy Honda/UCSD dataset obtained with sequence length of 50 frames. FIG. 26A shows the recognition rates per sequence and FIG. 26B shows the recognition rates per frame for clean 2603 and noisy 2606 sequences. While the performance of the CDN model drops with and without temporal and top-down connections (denoted as CDN with context and CDN w/o context, respectively), the performance drop is steeper when the contextual information is not used than when it is used. The difference was more prominent in the classification accuracy per frame. For comparison, the performance of SANP was also shown in FIG. 26A, whose performance drops significantly with noise.

To understand the extent of influence the temporal and top-down connections have on the representations, the hyper-parameters $\lambda$ and $\eta$ were varied in EQN. (36), which determine the extent of influence they have, respectively, during inference. The same test setup was used with the noisy Honda/UCSD sequences and the classification performance (per sequence and per frame) recorded for different $\lambda$ and $\eta$ values. To make the visualization easier, the same set of hyper-parameters were used for both the layers, with sparsity parameters fixed at $\gamma_0=0.3$ and $\beta=0.05$, which were obtained after performing a parameter sweep for best performance. FIGS. 27A through 27D the recognition rate on the noisy Honda/UCSD data set, as a function of both temporal connection parameter ($\lambda$) and top-down connection parameter ($\eta$). It can be seen that the performance was dependent on both the parameters and should be set reasonably (neither too high nor too low) to obtain good results.

Figure 27A:
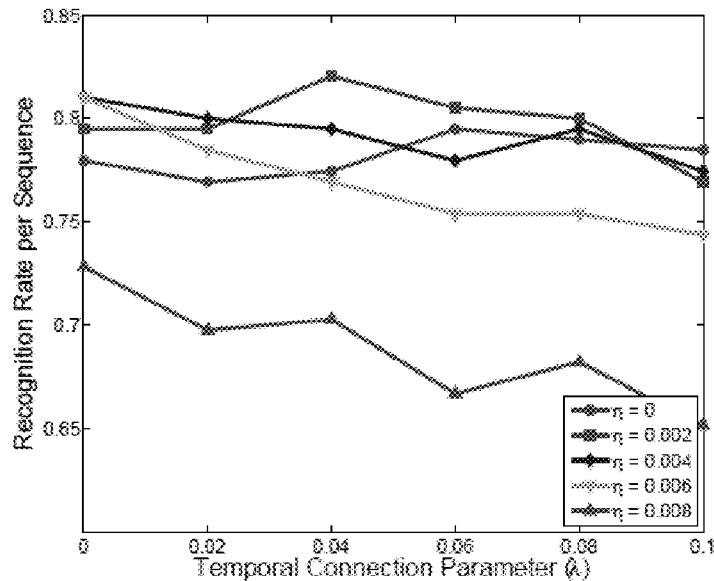
Figure 27B:
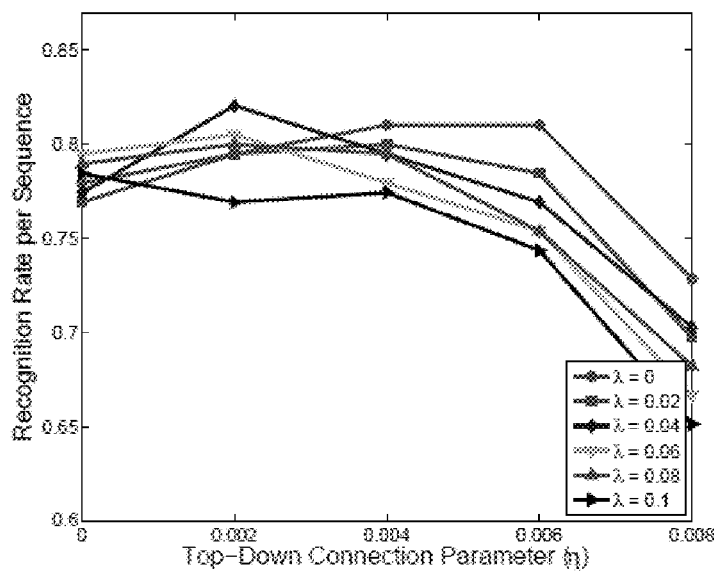
Figure 27C:
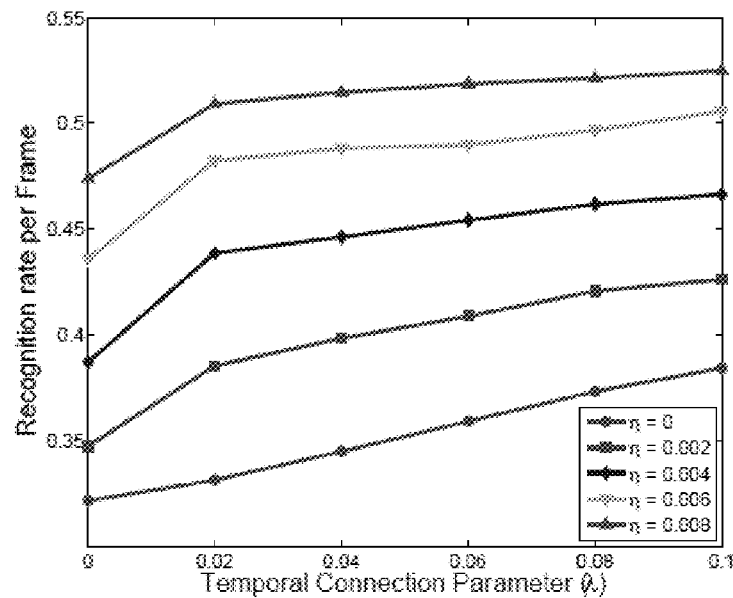
Figure 27D:
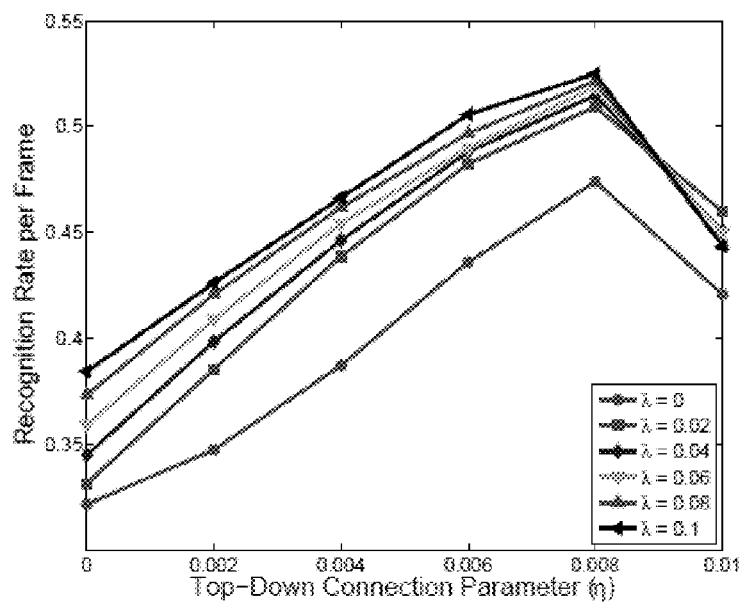

FIGS. 27A and 27C show recognition rates versus temporal connection parameter ($\lambda$), where each plot indicates a particular value of $\eta$, while FIGS. 27B and 27D show recognition rates versus top-down connections parameter ($\eta$), where each plot indicates a particular value of $\lambda$. Also, FIGS. 27A and 27B show the recognition rates per sequence and FIGS. 27C and 27D show recognition rates per frame. Note that the higher recognition rates per frame are not always reflected as higher recognition rates per sequence. While these plots show the effective contribution of temporal and top-down connections, they also show that while the performance is better with either temporal or top-down connections, the best performance was obtained when both were available. This indicates that both temporal and top-down connections play an equally important role during inference.

Further analysis of the CDN model was carried out to understand the representations learned in the hierarchical model and get additional insight into the working of the top-down and temporal connections. The model is based on the idea that any visual input sequence unfolds with well-defined spatio-temporal dynamics and that these dynamics can be modeled as trajectories in some underlying attractor manifold. In the hierarchical setting, it is further assumed that the shape of manifold that describes the inputs is itself modulated by the dynamics of an even higher level attractor manifold. From a generative model perspective, this is equivalent to saying that a sequence of causes in a higher layer non-linearly modulate the dynamics of a lower layer representations, which in turn represent an input sequence. In other words, such a hierarchical dynamic model represents the inputs as "sequences of sequences". The testing shows that the CDN model can learn hierarchy of attractors, such that the complexity of the representation increases with the depth of the model. Also, we the temporal and top-down connections (or empirical priors) lead the representations into stable attractors, making them robust to noise.

Figures 28A, 28B:
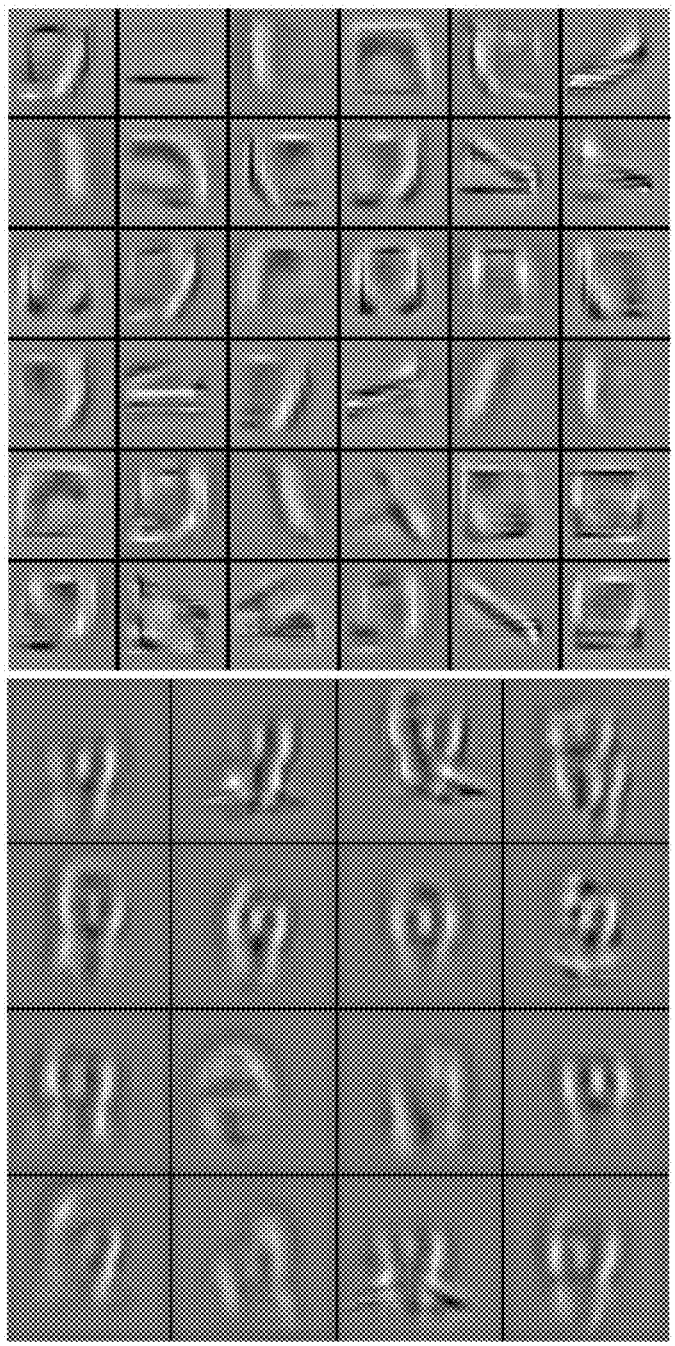
FIGS. 28A and 28B are visualizations of examples of receptive fields in accordance with various embodiments of the present disclosure.

The CDN model can learn the hierarchical compositions of objects from the data itself in a completely unsupervised manner. For this, consider the VidTIMIT dataset, where face videos of 16 different people with different facial expressions are used as inputs. FIGS. 28A and 28B illustrate the hierarchical decomposition of object parts learned by the CDN model from face videos of 16 different subjects in the VidTIMIT dataset. FIG. 28A shows the receptive fields of layer 1 causes and FIG. 28B shows the receptive fields of layer 2 causes. Both were constructed as weighted linear combinations of filters in the layers below. Layer 1 states have similar receptive fields as shown in 24A.

Two-layered networks with 16 first layer states, 36 first layer causes, 36 second layer states and 16 second layered causes were used with 3×3 non-overlapping pooling regions in the first layer and 2×2 non-overlapping pooling regions for the second layer. The receptive fields of the layer 1 and layer 2 causes were constructed using the linear combination based on the layers below and are shown in FIGS. 28A and 28B. The model was able to learn a hierarchical structure of the faces. While the first layer states represent primitive features like edges, first layer causes learn parts of the faces. The second layer causes, where the model combines the responses of the first layer causes, were able to represent an entire face. More importantly, each cause unit in the second layer was specific to a particular face (or object), increasing the discriminability between faces.

The top-down information can be useful to de-noise a highly corrupted video by using the information from context. To show this, the same CDN model was used on the face video sequences. The face video sequence (different from the one used to learn the model) was corrupted with a structured noise, where one-fourth part of each frame was occluded with a completely unrelated image. There was no correlation between the occlusion in two consecutive frames. FIGS. 29A-29B and 30A-30B show the results obtained from the testing.

Figure 29A:
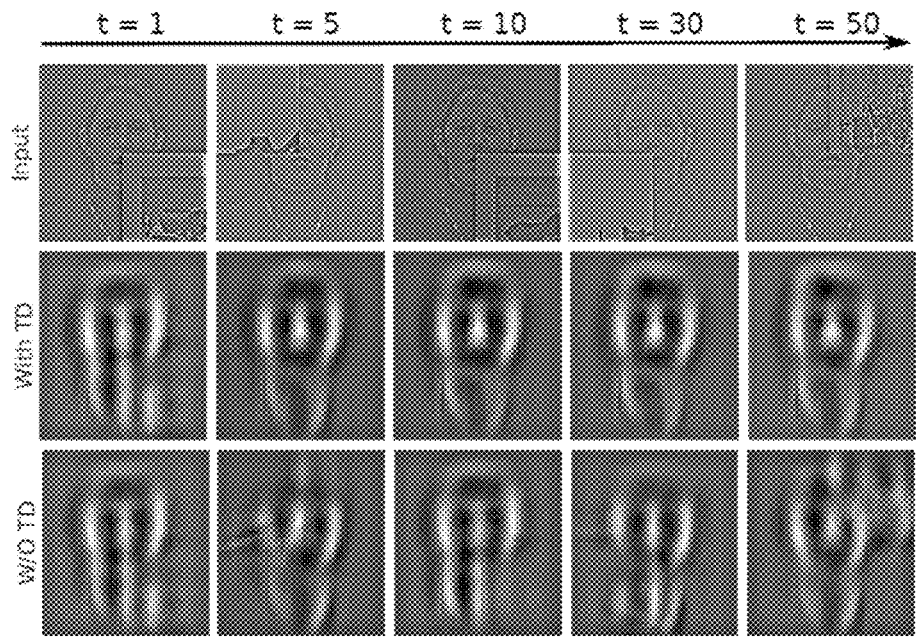
FIGS. 29A and 29B are examples of video de-noising in accordance with various embodiments of the present disclosure.
Figure 29B:
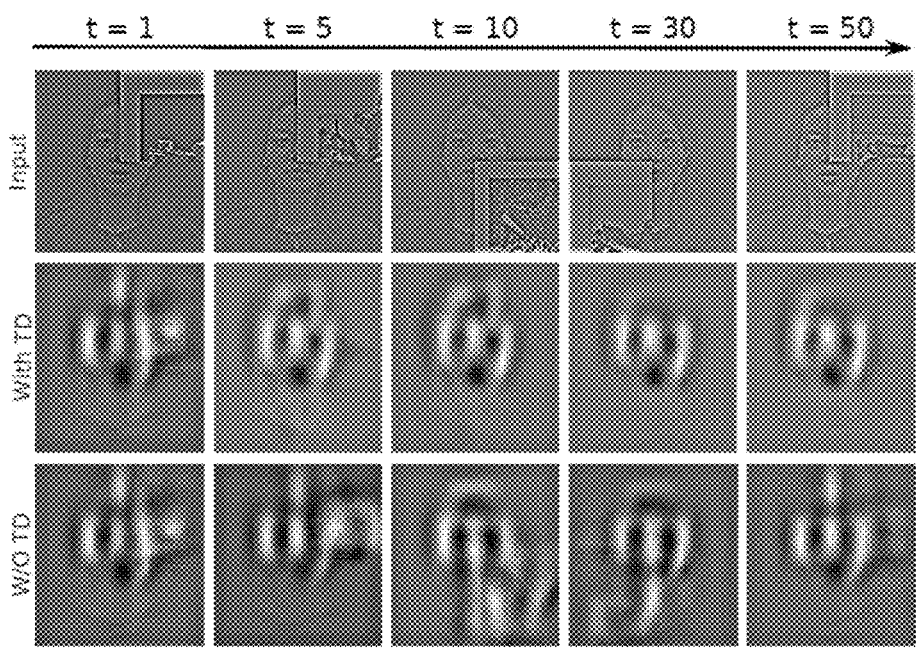

FIGS. 29A and 29B show examples of video de-noising with temporal and top-down connections with two different video sequences. In the examples of FIGS. 29A and 29B, the response of the layer two states was projected into the input space to understand the underlying representation of the model. For each example, the top row shows corrupted video sequences where in every frame one-fourth of the frame is occluded with an unrelated image, the middle row shows the linear projection of layer 2 states onto the image space when inference is performed with temporal and top-down connections and the bottom row shows the linear project of layer 2 states when inference is performed without temporal or top-down connections. Since layer two states get information from the bottom layer as well as the top-down information from the second layer causes, it should be able to resolve the occluded portion of the video sequence using the contextual information over time and space. It can be seen that with the top-down information the representation over time gets stabilized and the model was able to resolve the occluded part of the input video sequence. On the other hand, without the contextual information the representations did not converge to a stable solution.

Figure 30A:
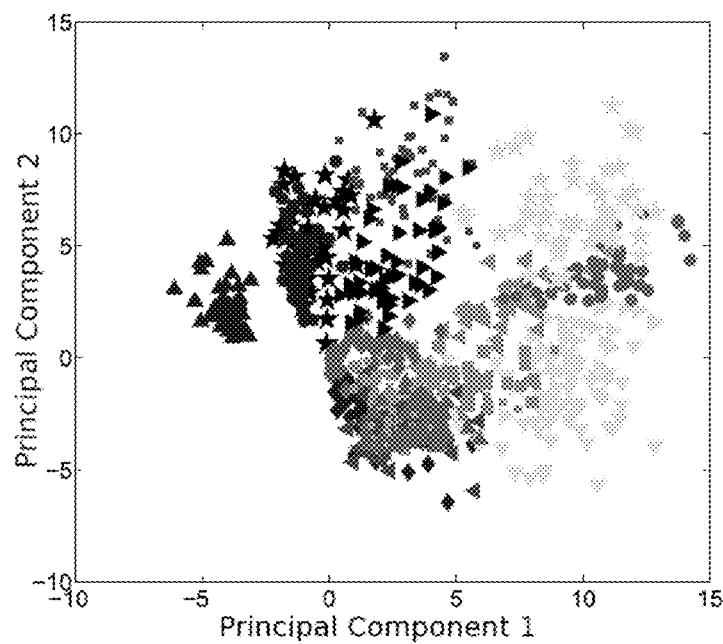
FIGS. 30A and 30B are examples of PCA (principal component analysis) projections for the video de-noising in accordance with various embodiments of the present disclosure.
Figure 30B:
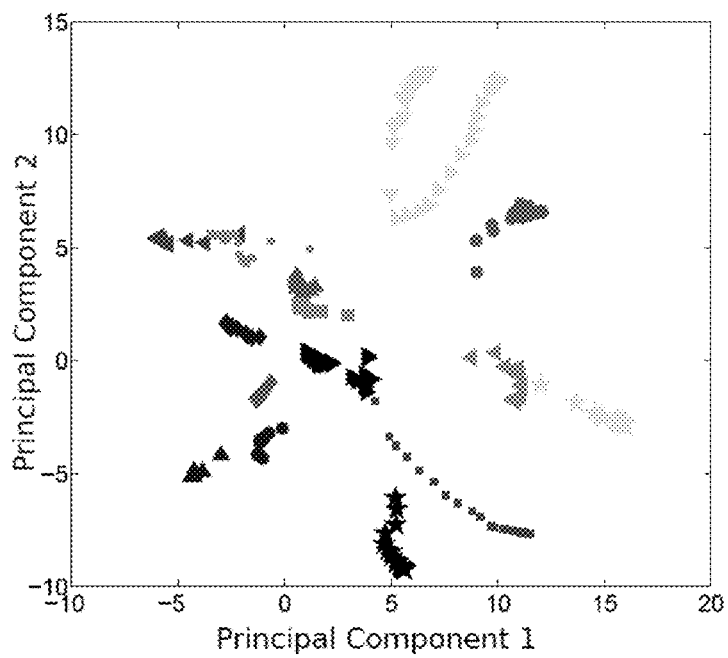

FIGS. 30A and 30B show examples of PCA (principal component analysis) projections of layer two causes in the de-noising test without and with temporal and top-down connections, respectively. Again, it was observed that representations obtained with temporal and top-down connections for each subject were stable and mapped into well-defined attractors, separated from one another as illustrated in FIG. 30B. On the other hand, without these connections the representations were not stable and could not be well separated as illustrated in FIG. 30A.

Many deep learning methods such as deep belief networks, stacked auto-encoders, and convolutional neural networks encode the inputs as a hierarchical representation. In contrast to the CDN model, these methods neither explain away nor consider temporal and top-down connections, and only focus on feed-forward "rapid" recognition without context. In fact, the CDN model can also implemented as a feed-forward network by performing approximate inference. Starting from initial rest (with all the variables initialized to zeros) and considering only a single FISTA iteration, the states and the causes can be approximately inferred as:

$$X_t^{l,k} = \frac{1}{L} \tau_{\gamma_0} \left( \sum_{m=1}^{D_{l-1}} \tilde{C}_{k,m} * U_t^{m,l-1} \right) \quad (54)$$

$$U_t^{l,d} = \frac{1}{L} \tau_\beta \left( \sum_{k=1}^{K_l} \tilde{B}_{k,m} * X_t^{l,k} \right),$$

where $\tau_\gamma(\bullet)$ is a soft thresholding function and L determines the step-size. But such representations have only a limited capacity, as there is no competition between the elements to explain the inputs. On the Caltech-101 dataset test described above, such approximate inference only produced a modest recognition rate of 46% 5 (chance was below 1%).

Figure 31:
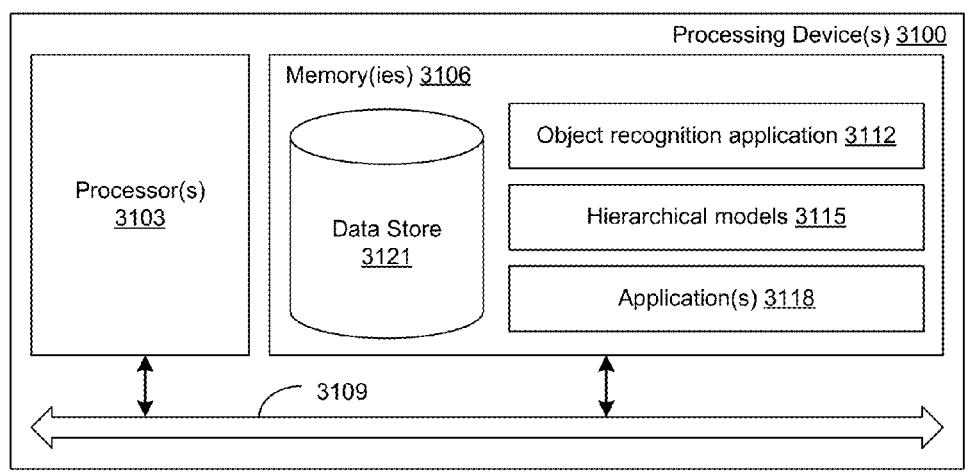
FIG. 31 is a schematic block diagram of an example of a computing device in accordance with various embodiments of the present disclosure.

With reference now to FIG. 31, shown is a schematic block diagram of a computing device 3100 according to an embodiment of the present disclosure. The computing device 3100 includes at least one processor circuit, for example, having a processor 3103 and a memory 3106, both of which are coupled to a local interface 3109. To this end, the computing device 3100 may comprise, for example, at least one server computer or like device. The local interface 3109 may comprise, for example, a data bus with an accompanying address/control bus or other bus structure as can be appreciated.

Stored in the memory 3106 are both data and several components that are executable by the processor 3103. In particular, stored in the memory 3106 and executable by the processor 3103 are an object recognition application 3112, one or more hierarchical models 3115 that may be used for object recognition, and potentially other applications 3118. Also stored in the memory 3106 may be a data store 3121 including, e.g., images, video and other data. In addition, an operating system may be stored in the memory 3106 and executable by the processor 3103. It is understood that there may be other applications that are stored in the memory and are executable by the processor 3103 as can be appreciated.

Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages. A number of software components are stored in the memory and are executable by the processor 3103. In this respect, the term "executable" means a program file that is in a form that can ultimately be run by the processor 3103. Examples of executable programs may be, for example, a compiled program that can be translated into machine code in a format that can be loaded into a random access portion of the memory 3106 and run by the processor 3103, source code that may be expressed in proper format such as object code that is capable of being loaded into a random access portion of the memory 3106 and executed by the processor 3103, or source code that may be interpreted by another executable program to generate instructions in a random access portion of the memory 3106 to be executed by the processor 3103, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, the memory 3106 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 3103 may represent multiple processors 3103 and the memory 3106 may represent multiple memories 3106 that operate in parallel processing circuits, respectively. In such a case, the local interface 3109 may be an appropriate network that facilitates communication between any two of the multiple processors 3103, between any processor 3103 and any of the memories 3106, or between any two of the memories 3106, etc. The processor 3103 may be of electrical or of some other available construction.

Although portions of the object recognition 3112, hierarchical models 3115, and other various systems described herein may be embodied in software or code executed by general purpose hardware, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The object recognition application 3112 and hierarchical models 3115 can comprise program instructions to implement logical function(s) and/or operations of the system. The program instructions may be embodied in the form of source code that comprises human-readable statements written in a programming language or machine code that comprises numerical instructions recognizable by a suitable execution system such as a processor 703/803 in a computer system or other system. The machine code may be converted from the source code, etc. If embodied in hardware, each block may represent a circuit or a number of interconnected circuits to implement the specified logical function(s).

Also, any logic or application described herein, including the object recognition application 3112 and hierarchical models 3115 that comprises software or code can be embodied in any non-transitory computer-readable medium for use by or in connection with an instruction execution system such as, for example, a processor 3103 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A system, comprising:
   processing circuitry including a processor, the processing circuitry configured to process a sequence of images to recognize an object in the sequence of images, the recognition of the object based upon a hierarchical model, where:
   a first level of the hierarchical model includes:
   a state estimator configured to determine state data associated with one image of the sequence of images based at least in part upon input data from the one image, the input data comprising a plurality of vectors associated with corresponding overlapping pixel patches extracted from the one image; and
   a parameter estimator configured to determine parameters of the state estimator of the first level based at least in part upon the input data from the one image; and
   a second level of the hierarchical model includes:
   a state estimator configured to determine state data associated with the one image based at least in part upon input data from the first level of the hierarchical model and provide a top-down prediction to the state estimator of the first level; and
   a parameter estimator configured to determine parameters of the state estimator of the second level based at least in part upon the input data from the first level.

2. The system of claim 1, wherein the first level of the hierarchical model receives input data from another image of the sequence of images and provides output data as input data to the second level of the hierarchical model.

3. The system of claim 1, wherein the hierarchical model is a distributed hierarchical model.

4. A system, comprising:
   a first image processing layer of a hierarchical model, including:
   sparse inference input circuitry configured to determine a plurality of states based at least in part upon input data associated with a video image; and
   sparse inference output circuitry configured to determine a cause associated with the video image, the cause based at least in part upon the plurality of states determined by the sparse inference input circuitry of the first image processing layer; and
   a second image processing layer of the hierarchical model, including:
   sparse inference input circuitry configured to determine at least one state based at least in part upon input data comprising the cause determined by the sparse inference output circuitry of the first image processing layer; and
   sparse inference output circuitry configured to determine a second cause associated with the video image, the second cause based at least in part upon the at least one state determined by the sparse inference input circuitry of the second image processing layer; where the sparse inference output circuitry of the second image processing layer is configured to receive a top-down prediction from sparse inference output circuitry of a third image processing layer.

5. The system of claim 4, wherein the sparse inference input circuitry of the second image processing layer is configured to provide a top-down prediction to the sparse inference output circuitry of the first image processing layer.

6. The system of claim 4, wherein the input data comprises a plurality of vectors associated with corresponding overlapping pixel patches extracted from the video image.

7. The system of claim 4, wherein a first state of the plurality of states are based at least in part upon a state-space prediction corresponding to a preceding first state.

8. The system of claim 4, wherein the input data associated with the video image comprises causes determined by a second image processing layer.

9. The system of claim 4, wherein the sparse inference input circuitry of the first image processing layer infers the state based at least in part upon an over-complete dictionary of filters.

10. The system of claim 4, wherein the sparse inference output circuitry of the first image processing layer infers the cause based at least in part upon an invariant matrix.

11. The system of claim 4, wherein the sparse inference output circuitry of the first image processing layer is configured to provide a sparsity parameter to the sparse inference input circuitry of the first image processing layer.

12. A method, comprising:
determining input data from a plurality of overlapping pixel patches of a video image;
determining a plurality of corresponding states based at least in part upon the input data associated with the video image and an over-complete dictionary of filters;
determining a first cause associated with a first layer of a hierarchical model based at least in part upon the plurality of corresponding states;
determining at least one state based at least in part upon input data comprising the first cause, where the first cause is modulated based upon a top-down prediction associated with a second cause associated with a second layer of the hierarchical model; and
determining the second cause associated with the second layer of the hierarchical model, the second cause based at least in part upon the at least one state.

13. The method of claim 12, further comprising:
determining a sparsity parameter based at least in part upon the plurality of corresponding states; and
determining a plurality of subsequent states based at least in part upon the sparsity parameter.

14. The method of claim 12, wherein the first cause is modulated based upon a top-down prediction associated with a preceding cause.

* * * * *

UNITED STATES PATENT AND TRADEMARK OFFICE
CERTIFICATE OF CORRECTION

| | |
|---|---|
| PATENT NO. | : 9,536,177 B2 |
| APPLICATION NO. | : 14/557262 |
| DATED | : January 3, 2017 |
| INVENTOR(S) | : Rakesh Chalasani et al. |

It is certified that error appears in the above-identified patent and that said Letters Patent is hereby corrected as shown below:

In the Specification

Column 1, Line 16 after "under agreement", delete "M00014-10-1-0375" and insert --N00014-10-1-0375--.

Signed and Sealed this
Sixth Day of June, 2017

Michelle K. Lee
*Director of the United States Patent and Trademark Office*